United States Patent
Tian et al.

(10) Patent No.: US 11,342,796 B2
(45) Date of Patent: May 24, 2022

(54) CONTROLLING WIRELESS CHARGING

(71) Applicant: Google LLC, Mountain View, CA (US)

(72) Inventors: Qi Tian, San Jose, CA (US); Veera Venkata Siva Nagesh Polu, Mountain View, CA (US); Liang Jia, San Mateo, CA (US); Liyu Yang, Mountain View, CA (US); Jae-won Hwang, Menlo Park, CA (US); Rahul Apte, Mountain View, CA (US); Srikanth Lakshmikanthan, Milpitas, CA (US); Srenik Suresh Mehta, Fremont, CA (US); Robert Thomas Shone, San Francisco, CA (US)

(73) Assignee: Google LLC, Mountain View, CA (US)

( * ) Notice: Subject to any disclaimer, the term of this patent is extended or adjusted under 35 U.S.C. 154(b) by 758 days.

(21) Appl. No.: 16/125,328

(22) Filed: Sep. 7, 2018

(65) Prior Publication Data
US 2020/0083754 A1    Mar. 12, 2020

(51) Int. Cl.
*H02J 50/60* (2016.01)
*H02J 50/12* (2016.01)
(Continued)

(52) U.S. Cl.
CPC .............. *H02J 50/60* (2016.02); *H02J 7/045* (2013.01); *H02J 50/12* (2016.02); *H02J 50/90* (2016.02);
(Continued)

(58) Field of Classification Search
CPC . H02J 50/12; H02J 50/60; H02J 7/045; H04B 5/0037; H04B 5/0043
See application file for complete search history.

(56) References Cited

U.S. PATENT DOCUMENTS

| 7,683,572 B2 | 3/2010 | Toya |
| 9,442,172 B2 | 9/2016 | Verghese et al. |

(Continued)

FOREIGN PATENT DOCUMENTS

KR    101257676    5/2013

OTHER PUBLICATIONS

'mrtemotech.tumblr.com' [online] "Ghost 100 Wireless Charging Pad," MrTeMoTech™, Aug. 30, 2013 [retrieved on Apr. 15, 2015] Retrieved from Internet: URL<http://mrtemotech.tumblr.com/post/61347147926/ghost-100-wireless-charging-pad-review> 8 pages.

(Continued)

*Primary Examiner* — David V Henze-Gongola
(74) *Attorney, Agent, or Firm* — Fish & Richardson P.C.

(57) ABSTRACT

Methods, systems, and techniques for safely controlling wireless charging in the presence of a foreign object are presented. A method includes determining a power difference between a power transmitted by a wireless charger and a power received by an electronic device, determining a level of misalignment of the electronic device with respect to the wireless charger; estimating an amount of power difference due to the level of misalignment of the electronic device with respect to the wireless charger, adjusting a power difference threshold for the wireless charger based on the estimated amount of power difference, and controlling operation of the wireless charger based on the power difference and the adjusted power difference threshold.

17 Claims, 8 Drawing Sheets

(51) Int. Cl.
H02J 7/04 (2006.01)
H04B 5/00 (2006.01)
H02J 50/90 (2016.01)

(52) U.S. Cl.
CPC ......... *H04B 5/0037* (2013.01); *H04B 5/0043* (2013.01); *H02J 2207/10* (2020.01)

(56) References Cited

U.S. PATENT DOCUMENTS

| | | | |
|---|---|---|---|
| 2010/0201513 | A1 | 8/2010 | Vorenkamp |
| 2011/0221388 | A1 | 9/2011 | Low et al. |
| 2013/0033224 | A1 | 2/2013 | Raedy |
| 2014/0002013 | A1 | 1/2014 | Kossi et al. |
| 2014/0015493 | A1 | 1/2014 | Wirz et al. |
| 2014/0111019 | A1 | 4/2014 | Roy et al. |
| 2014/0168012 | A1 | 6/2014 | Mankowski et al. |
| 2016/0218567 | A1* | 7/2016 | Nakano .................. H02J 50/80 |
| 2016/0325630 | A1* | 11/2016 | Dede ....................... H02J 7/025 |

OTHER PUBLICATIONS

'wikipedia.org' [online] "Qi(Standard)," Aug. 22, 2018, [retrieved on Aug. 30, 2018] Retrieved from Internet: URL<https://en.wikipedia.org/wiki/Qi_(standard)> 6 pages.

'wikipedia.org' [online] "Power Matters Alliance," Jun. 8, 2015, [retrieved Jul. 22, 2015], retrieved from the Internet: URL<https://en.wikipedia.org/wiki/Power_Matters_Alliance>, 5 pages.

'wikipedia.org' [online] "Qi (inductive power standard)," Jul. 16, 2015, [retrieved on Jul. 22, 2015], retrieved from the Internet: URL<https://en.wikipedia.org/wiki/Qi_(inductive_power_standard)>, 5 pages.

'wikipedia.org'[online] "Wireless power," Jul. 20, 2015, [retrieved on Jul. 22, 2015] Retrieved from Internet: URL<https://en.wikipedia.org/wiki/Wireless_power>, 18 pages.

'www.wirelesspowerconsortium.com' [online] "Methods for Foreign Object Detection in Inductive Wireless Charging," Vladimir Muratov, Qi Developer Forum, Nov. 16, 2017, [retrieved on Aug. 30, 2018] Retrieved from Internet: URL<https://www.wirelesspowerconsortium.com/data/downloadables/1/9/0/9/wpc1704-vladimir-muratov-methods-for-foreign-object-detection.pdf> 17 pages.

Motorola, "Droid Mini User's Guide," Motorola Global Portal, retrieved on Jul. 22, 2015, retrieved from Internet: URL<https://motorola-global-portal.custhelp.com/ci/fattach/get/675624/1377023434/redirect/1/session/L2F2LzEvdGltZS8xNDI5MDc0MDEzL3NpZC8qWmhvT1VqbQ==/filename/68017479001A.pdf>, 74 pages.

Texas Instruments. "Introduction to Wireless Power," Available on or before Aug. 5, 2016 via the Wayback Machine Internet Archive [retrieved on Aug. 30, 2018] Retrieved from Internet: URL<www.emcchicago.org/pres/ti0415.pdf> 49 pages.

Wireless Power Consortium, "Introduction to the Power Class 0 Specification," Version 1.2.3, Feb. 2017, 16 pages.

Wireless Power Consortium, "The Qi Wireless Power Transfer System: Power Class 0 Specification: Parts 1 and 2: Interface Definitions," Version 1.2.3, Feb. 2017, 165 pages.

Wireless Power Consortium, "The Qi Wireless Power Transfer System: Power Class 0 Specification: Part 4: Reference Designs," Version 1.2.3, Feb. 2017, 336 pages.

* cited by examiner

CONTROLLING WIRELESS CHARGING

TECHNICAL FIELD

This specification generally relates to wireless charging of electronic devices.

BACKGROUND

Electronic devices can be configured to receive wireless power signals for charging a device battery and/or powering device operation.

SUMMARY

Inductive wireless charging systems enable a charger to recharge a battery-powered electronic device, such as a smartphone, by transmitting a wireless power signal (e.g., in the form of an AC magnetic field) that is received by a wireless power receiver of the device. In some cases, a portion of the transmitted power signal may also be received and absorbed by metal or other objects (e.g., "foreign objects") that are within inductive coupling range of the wireless charger, resulting in heating of the foreign object. In some implementations, as a safety precaution to prevent excessive heating of a foreign object, the system is configured to control the level of power transmitted by the charger if it determines that more than a threshold level of transmitted power is absorbed by the foreign object (e.g., a maximum power difference threshold between the amount of power transmitted and the amount of power received by the intended device). The power absorbed by the foreign object can be estimated based on a measured power difference for transmitted power, e.g., the difference between the power transmitted by the charger and the power received by the device. Often, if the system determines that the power difference exceeds the power difference threshold, the charger may cease transmitting power as a safety consideration, e.g., to avoid excessive heating of a foreign object assumed to be absorbing the energy not received by the charged device.

However, a number of factors, including misalignment of a device with respect to the charger, can cause a significant difference between transmitted power and received power, even when no foreign object is present. As a result, foreign object detection processes can sometimes terminate wireless charging inappropriately when a power difference is due to non-ideal coupling, e.g., due to misalignment or other factors that do not represent unsafe conditions.

This document describes multiple techniques that can be used, individually or in combination, to improve the foreign object detection process. In particular, the techniques can avoid false positives in detecting foreign objects, and thus avoid the wireless charging process being inappropriately terminated when conditions are actually safe for charging to continue.

A first technique involves detecting physical misalignment between the charger and the device being charged. This may involve the use of alignment coils in a device, which may allow the position of the receiving coil relative to the transmission coil to be determined. Based on the misalignment, the power difference threshold for charging may be adjusted (e.g., increased) to allow charging at a higher power difference level.

A second technique involves lowering the transmission power to reduce the absolute amount of power lost and gain headroom for misalignment. As discussed below, the power difference margin may be a higher proportion of transmitted power for lower transmission power levels. For example, when transmitting 10 W, the allowable power difference may be 500 mW (e.g., 5% of transmitted power), while transmitting at 5 W may have an allowable power difference of 350 mW (e.g., 7% of transmitted power). Thus, by reducing the transmitted power, the charger can operate with increased headroom to tolerate misalignment and power difference, and charging can continue when the power difference would be unacceptable at the full requested power level.

A third technique involves using information about a case or enclosure on the device being charged, e.g., a protective case that a user has added, to determine misalignment and adjust a power difference threshold. The model or characteristics of the case can be determine through user input or through reading an identifier of the case, e.g., marked with an optical code, an RFID tag, etc.

A fourth technique allows the charger and/or device being charged to use a prior charging history to vary charging thresholds. A customized, adaptive threshold can be set based on the typical range of power differences that have occurred for a particular device. This can better account for user behavior, such as a certain user consistently placing his phone out of alignment with the charger. For example, the power difference for a specific device and a specific charger can be measured for several charging sessions and stored. A typical or baseline level of power difference can then be determined for that device, or for the device and charger combination. Rather than use a fixed power difference threshold, a customized power difference threshold is set based on the prior charging history so that foreign object detection attempts to detect a deviation from the usual power difference range for the particular user, device, or device/charger combination, rather than relying on a fixed threshold. In other words, a change from the typical power difference (such as a spike in power difference compared to prior levels), rather than an absolute power difference calculation, can be a more reliable indicator that a foreign object is present. In some implementations, artificial intelligence or machine learning models can be trained based on the charging parameters of prior charging sessions, for a single user or for multiple users. These models may be used to detect foreign objects, e.g., based on the outputs of one or more trained classifiers, rather than comparing to a power difference threshold alone. The inputs to the models may include power levels and/or power difference values, but may additionally or alternatively include other inputs, such as position data, device identifiers, case identifiers, historical charging measures, and so on.

A fifth technique involves using sensing techniques to detect foreign objects. For example, a charger can use its transmission coil to send pulses used to measure a quality factor Q. When metal is detected, the charger can initiate negotiation, and when a foreign object such as a coin does not respond appropriately, the transmitter can determine that a foreign object is present. If a phone or other device is then placed on the charger, the charger can notify the device that there was recently a foreign object, and can have a user confirm that the foreign object has been removed. In a similar manner, device to be charged may transmit a signal to detect foreign metal objects. Other sensors may be used to detect whether a case or enclosure is present on the device to be charged, and this information may also be used to adjust the power difference threshold applied.

Generally, in some implementations, the system adjusts the power difference threshold to account for factors other than the presence of a foreign object that contribute to the power difference. For example, a lateral misalignment between the device and the charger (e.g., where the device's position relative to the charger is offset from a preferred position for maximum power transfer efficiency) can reduce the coupling between the two coils and thus increase the power difference. The preferred position can be, for example, a position in which a receiving coil of the device's power receiver is directly above a transmitting coil of the charger's transmitter. Similarly, a vertical misalignment between the device and the charger, where the device's receiving coil is separated from the charger's transmitting coil by a greater-than-expected distance (e.g., due to the presence of an added protective case or other device enclosure between the device and the charger) can reduce inductive coupling and increase the power difference.

In some implementations, the system determines a misalignment between the device and charger and calculates a misalignment loss that represents the power difference due to the determined misalignment between the device and the charger. Based on the misalignment loss, the system can adjust the power difference threshold used for determining whether to control charger operation.

In some implementations, the lateral misalignment between the wireless charger and the electronic device is determined by the device. For example, the device can include a pair of alignment coils, where each coil of the pair is located at a position that is laterally offset from the device's receiving coil. In some implementations, each alignment coil of the pair is located at a same distance from the receiving coil, but in an opposite direction (e.g., one alignment coil is located to the left (e.g., in a −X direction) of the receiving coil while the other alignment coil is located to the right (e.g., in a +X direction) of the receiving coil).

Like the receiving coil of the wireless power receiver, the alignment coils inductively couple to the transmitting coil of the charger, such that the electromagnetic power signal transmitted by the charger induces an AC voltage in each of the alignment coils. In some implementations, when the device and charger are well-aligned (e.g., the device's receiving coil is generally centered over the charger's transmitting coil), the transmitted electromagnetic power signal induces a same, or nearly same, AC voltage in each alignment coil. As a result, the differential voltage induced on the two alignment coils will be zero or near-zero.

However, if the device and the charger are misaligned, the transmitted electromagnetic power signal will not induce the same AC voltage in each alignment coil. Rather, it will induce a greater voltage in the alignment coil that is located closer to the center of the transmitting coil, resulting in a non-zero differential voltage for the two alignment coils. The magnitude and sign of the differential voltage can then be used by the system to determine a lateral misalignment between the device and the charger. For example, the system can determine the physical misalignment (e.g., the device and the charger are misaligned by two millimeters) that correlates with a differential voltage for a particular device/charger pair. As discussed below, the system can use an algorithm or access a look-up table to determine the amount of misalignment.

In some implementations, the device may include multiple pairs of alignment coils for determining the lateral misalignment. For example, the device may include two pairs of alignment coils, where the pairs are oriented perpendicular to one another (e.g., a first pair of alignment coils that are offset from the power receiving coil along the +X/−X directions and a second pair of alignment coils that are offset from the power receiving coil along the +Y/−Y directions). A device that includes multiple pairs of alignment coils, may determine multiple misalignment values. For example, the device may determine a misalignment value for each pair of alignment coils (e.g., an X misalignment value and a Y misalignment value), where the misalignment value for the pair indicates a misalignment along the axis defined by the coils of the pair.

In some implementations, in addition to, or instead of, determining a lateral misalignment between the wireless charger and the device, the system determines a vertical misalignment (e.g., a vertical offset in the +Z direction) between the device and the charger that indicates a greater-than-preferred, or greater-than-expected, separation between the device's receiver and the charger's transmitter. A vertical misalignment greater than the expected separation between the device and the charger reduces the coupling between the device's receiving coil and the charger's transmitting coil and results in additional power difference.

The system can determine the vertical misalignment, for example, based on a signal strength information generated by the device. In some implementations, the device provides the signal strength information to the charger (e.g., in a signal strength packet or other communication) during a negotiation phase of wireless charging. Based on the signal strength information, the system can determine the vertical misalignment.

In some implementations, the vertical misalignment may arise due to a case or other enclosure that is between the device and the charger. Here, the system may determine the vertical misalignment based on identifying information for the case or enclosure. For example, a user of the device may enter case identifying information (e.g., a case identifier, a brand, a thickness for the case, a type of material for the case) through a user-interface of the electronic device. In some implementations, using the case identifying information, the system accesses information related to the case (e.g., the case thickness) that it uses to determine the vertical misalignment.

In some implementations, the system determines the case identifying information from a radio-frequency ID (RFID) tag or other device on or integrated into the case. For example, the case can include an RFID tag that provides case identifying information to the electronic device or to the charger through near-field communication. The system can use the case identifying information to determine the thickness of the case or other case properties that can be used to determine the vertical misalignment.

Based on the determined misalignment, the system then estimates an amount of power difference caused by the reduced coupling that results from the misalignment between the device and the charger (e.g., the misalignment loss). The misalignment loss can be determined based on the lateral misalignment (e.g., the X misalignment and/or the Y misalignment), the vertical misalignment (e.g., the Z offset) or both the lateral and the vertical misalignments.

In some implementations, the system estimates an amount of power difference based on the power difference during one or more previous charging sessions. For example, a particular user may consistently place the device on the charger in a position that results in a larger amount of power difference (e.g., by placing the device at an edge of the charger). Based on the power difference detected during previous charging sessions, the system can estimate the power difference for a current charging session. In this way, the system can customize the estimated power difference for a user based on previous user behavior.

Based on the estimated misalignment loss, the system can then adjust the power difference threshold at which the system controls transmitter operation. For example, the system may increase the power difference threshold to account for the misalignment loss by adding the misalignment loss to a predetermined foreign object detection ("FOD") power difference threshold. The power difference threshold can be determined by a particular standard or protocol (e.g., the Qi standard) and may indicate a level of power absorption by a foreign object determined to be unsafe.

In some implementations, the system calculates a power difference and compares the power difference to the adjusted power difference threshold to determine whether to control the charger operation. For example, the system can calculate the power difference by determining the difference between the level of power transmitted by the charger and the level of power received by the device. If the power difference exceeds the adjusted power difference threshold, the system can adjust charger operation.

In some implementations, the system ceases power transmission by the charger if the power difference exceeds the adjusted power difference threshold. In some implementations, the system reduces the level of power transmitted by the charger such that the power difference does not exceed the adjusted power difference threshold. By ceasing power transmission or reducing transmitted power levels such that transmitted power does not exceed the adjusted threshold, the system avoids potentially unsafe heating of a foreign object within coupling range of the charger.

In some implementations, a method includes operations of (i) determining a power difference between a power transmitted by a wireless charger and a power received by an electronic device, (ii) determining a level of misalignment of the electronic device with respect to the wireless charger, (iii) estimating an amount of power difference due to the level of misalignment of the electronic device with respect to the wireless charger, (iv) adjusting a power difference threshold for the wireless charger based on the estimated amount of power difference, and (v) controlling operation of the wireless charger based on the power difference and the adjusted power difference threshold.

In some implementations, controlling the operation of the wireless charger based on the power difference and the adjusted power difference threshold includes controlling the wireless charger to transmit power in response to determining that the power difference satisfies the adjusted power difference threshold. In some cases, before adjusting the power difference threshold for the wireless charger, the wireless charger is configured to terminate power transmission when the power difference does not satisfy the power difference threshold, where the power difference satisfies the adjusted power difference threshold but the power difference does not satisfy the power difference threshold prior to adjustment.

In some implementations, controlling the operation of the wireless charger based on the power difference and the adjusted power difference threshold comprises terminating power transmission by the wireless charger in response to determining that the power difference does not satisfy the adjusted power difference threshold.

In some implementations, the power difference is determined for transmission of power by the wireless charger at a first power level, where the power difference threshold before adjustment also corresponds to the first power level and the adjusted power difference threshold corresponds to a second power level that is lower than the first power level.

Here, controlling operation of the wireless charger based on the power difference and the adjusted power difference threshold can include: (i) in response to determining that the power difference does not satisfy the power difference threshold before adjustment, controlling the wireless charger to transmit power at the second power level that is lower than the first power level; and (ii) maintaining charging at the second power level in response to determining that a second power difference between the power transmitted at the second power level and a second power received by the electronic device satisfies the adjusted power difference threshold.

In some implementations, the electronic device comprises a wireless power receiving coil, and a first alignment coil and a second alignment coil located on opposite sides of the wireless power receiving coil. Here, determining the level of misalignment of the electronic device with respect to the wireless charger includes determining a first amount of misalignment of the electronic device with respect to the wireless charger along a first axis based on signals provided by the first alignment coil and the second alignment coil, and estimating the amount of power difference due to the level of misalignment of the electronic device with respect to the wireless charger includes estimating the amount of power difference based on the determined first amount of misalignment.

In some implementations, the electronic device also includes a third alignment coil and a fourth alignment coil located on opposite sides of the wireless power receiving coil, the third alignment coil and the fourth alignment coil being located along a second axis that is transverse to the first axis. Here, determining the level of misalignment of the electronic device with respect to the wireless charger also includes determining a second amount of misalignment of the electronic device with respect to the wireless charger along the second axis based on signals provided by the third alignment coil and the fourth alignment coil, and estimating the amount of power difference due to the level of misalignment of the electronic device with respect to the wireless charger includes estimating the amount of power difference based on the first amount of misalignment and the second amount of misalignment.

In some implementations, the second axis is perpendicular to the first axis.

In some implementations, the signals from the alignment coils comprise voltages, currents, or voltages and currents. In some implementations, determining the level of misalignment of the electronic device with respect to the wireless charger includes (i) determining the first amount of misalignment of the electronic device with respect to the wireless charger based on a first voltage difference between a voltage at the first alignment coil and the voltage of the second alignment coil, and (ii) determining the second amount of misalignment of the electronic device with respect to the wireless charger based on a second voltage difference between the voltage of the third alignment coil and the voltage of the fourth alignment coil.

In some implementations, determining the level of misalignment of the electronic device with respect to the wireless charger also includes determining a third amount of misalignment of the electronic device with respect to the wireless charger based on (i) a level of coupling of the electronic device with respect to the wireless charger, (ii) the first amount of misalignment, and (iii) the second amount of misalignment. Here, estimating the amount of power difference due to the level of misalignment of the electronic device with respect to the wireless charger includes estimating the amount of power difference based on the first amount of misalignment, the second amount of misalignment, and the third amount of misalignment.

In some implementations, the method also includes determining a signal strength of transmission between the electronic device and the wireless charger as a level of coupling of the electronic device with respect to the wireless charger. Here, determining the third amount of misalignment of the electronic device with respect to the wireless charger can include accessing a database that correlates the third amount of misalignment, the signal strength of transmission between the electronic device and the wireless charger, and at least one of the first amount of misalignment or the second amount of misalignment.

In some implementations, estimating the amount of power difference due to the level of misalignment of the electronic device with respect to the charger includes accessing a look-up table that associates an amount of power difference due to the level of misalignment with at least one of the first amount of misalignment, the second amount of misalignment, or the third amount of misalignment.

In some implementations, the method also includes determining a physical dimension of an enclosure of the electronic device, where determining the level of misalignment of the electronic device with respect to the wireless charger comprises determining the level of misalignment of the electronic device with respect to the wireless charger based on the physical dimension of the enclosure of the electronic device. In some implementations, determining the level of misalignment of the electronic device with respect to the wireless charger based on a physical dimension of the enclosure of the electronic device includes (i) receiving information identifying the enclosure of the electronic device or indicating a dimension of the enclosure, and (ii), based on the information identifying the enclosure of the electronic device or indicating the dimension of the enclosure, determining the level of misalignment of the electronic device with respect to the wireless charger. In some implementations, receiving information identifying the enclosure of the electronic device or indicating the dimension of the enclosure comprises receiving, from a radio-frequency identification tag of the enclosure of the device, information identifying the enclosure or indicating the dimension of the enclosure.

In some implementations, estimating an amount of power difference due to the level of misalignment of the electronic device with respect to the wireless charger includes estimating an amount of power difference based on amounts of power difference experienced during one or more previous wireless charging sessions for the electronic device.

In some implementations, the above-described method can be performed by a wireless charger or an electronic device (e.g., a smartphone, a cellular phone, a tablet computing device, or another electronic device). In some implementations, the method can be performed by a system including one or more processors and one or more computer-readable media having instructions stored thereon that, when executed by the one or more processors, cause the one or more processors to perform the above-described operations.

Certain implementations have particular advantages. The control of wireless charging can be improved to take into account power difference due to factors other than absorption by the foreign object. As a result, thresholds can be adjusted to account for misalignments and other factors affecting inductive coupling, so that foreign object detection does not terminate charging when a foreign object is not actually present. For example, by adjusting a power difference threshold for detection of a foreign object based on an estimated misalignment between the device and the charger, the techniques can account for power difference that results from a lateral misalignment of the device with respect to the charger and/or loss that results from a separation between the device and the charger due to the presence of a case or enclosure of the device.

By adjusting the power difference threshold for loss due to factors other than absorption by the foreign object, the techniques allow safe charging of the device under conditions where when conventional foreign object detection would terminate charging. For example, a system may be configured to terminate charging if it determines that the power difference exceeds a foreign-object-detection (FOD) power difference threshold, where the power difference threshold corresponds to an absorbed power associated with a predetermined unsafe level of heating for the object. If the device and the charger are misaligned, the power difference may exceed the power difference threshold before the object absorbs the power associated with unsafe heating level. Adjusting the power difference threshold to include the power difference due to misalignment increases power difference threshold, allowing the charger to continue transmitting power until the indicated level of power absorption by the foreign object is detected.

In some implementations, foreign object detection can be adapted for a particular user, device, device/charger combination, or particular circumstances. For example, one user may consistently place their device near the center of the wireless charger, resulting in a small amount of power difference due to misalignment, while another user may consistently place their device off-center with respect to the wireless charger, resulting a large amount of power difference due to misalignment. As another example, the charger may be resting on a surface with a slight incline, such that a device placed on it tends to slide towards an edge of the charger, resulting in a large amount of power difference due to misalignment. The system can estimate the misalignment or power difference for a current charging session based on the loss detected during one or more previous charging sessions and so customize the adjusted power difference threshold for a particular user or circumstances. With the improved thresholds, the system can avoid terminating charging when typical foreign object detection techniques would otherwise block charging.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
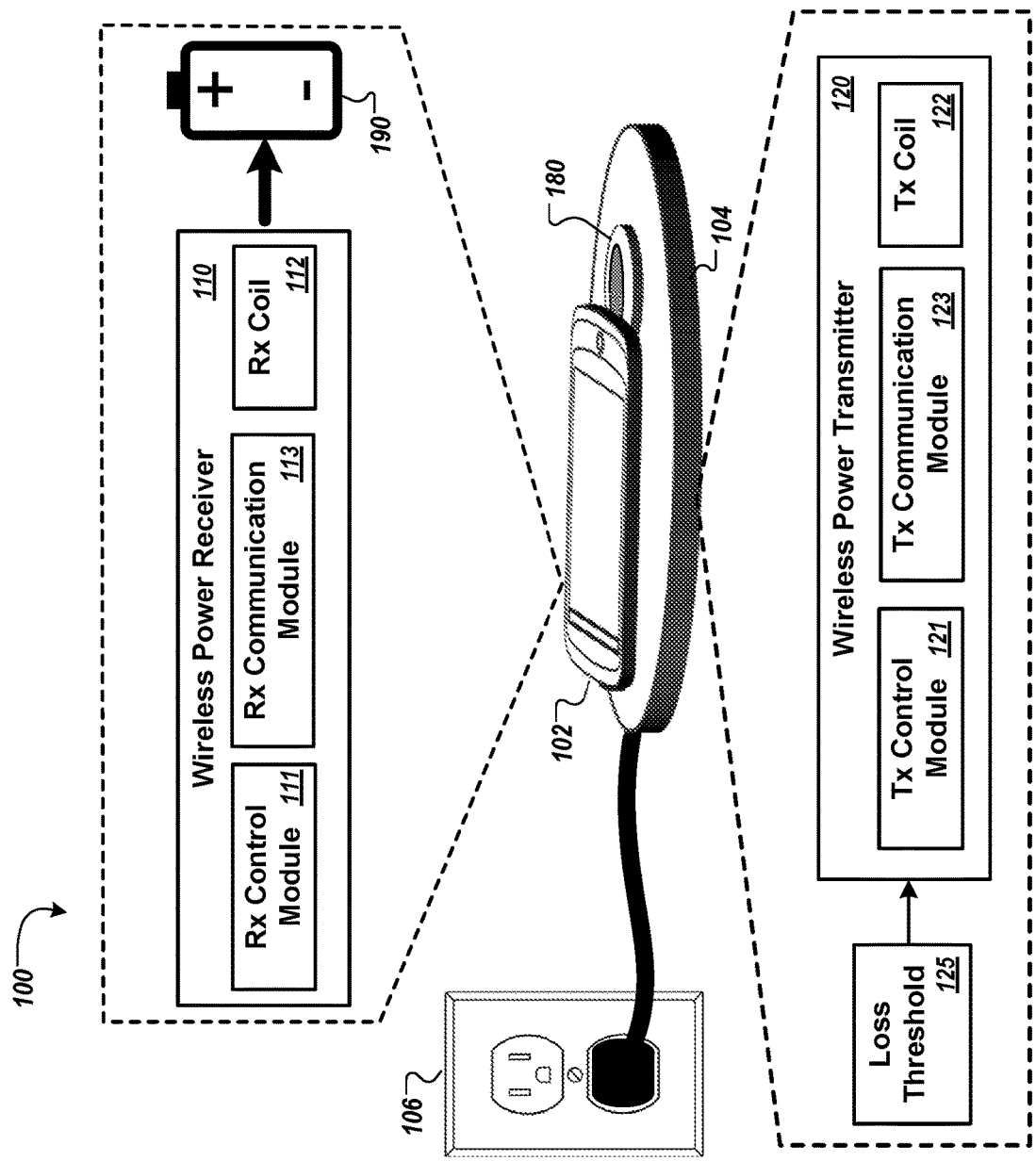
FIG. 1 is a diagram illustrating an example of a system for controlling wireless charging.

FIG. 1 is a diagram illustrating an example of a system 100 for controlling wireless charging of an electronic device 102 by a wireless charger 104. The wireless charger 104 includes a power transmitter 120 that generates a wireless electromagnetic power signal. The device 102 includes a wireless power receiver 110 for delivering power to a rechargeable battery 190. When placed in close proximity to (e.g., when positioned on a top surface of) the charger 104, due to inductive coupling, the power signal transmitted by the charger's transmitter 120 generates an AC signal in the device's power receiver 110, which can then be converted properly and used to charge the battery 190. By wirelessly transferring power from the charger 104 to the electronic device 102, the device battery 190 can be charged without physically connecting the device 102 to a power source.

In some cases, a foreign object 180 may be in close proximity to the charger 104, e.g., between the power receiver 110 and the transmitter 120, such that it inductively couples to, and absorbs a portion, of the transmitted power signal. This can present a safety hazard, since power absorption can heat the object 180. As a precaution to prevent unsafe levels of heating of foreign objects, the charger 104 is configured to cease transmitting power, or reduce the transmitted power level, if it detects that the difference between the power transmitted by the charger 104 and the power received by the device 102 (presumably absorbed by a foreign object such as object 180), exceeds a power difference threshold 125. As discussed below, the power difference threshold 125 can be adjusted to account for causes of power difference other than absorption by foreign objects so that the system can more accurately determine when the transmitted power should be adjusted.

The charger 104 is an electronic device that converts electrical power from a power source 106 to a transmitted wireless power signal that is received by the device 102. The charger 104 can receive power from any of various sources 106, including a battery source or AC wall power. In the example system 100 of FIG. 1, the charger 104 receives power via an AC electrical signal provided through a cable connected to a wall outlet 106. The charger 104 may transmit power to the device 102 using resonant inductive coupling.

The charger 104 includes a wireless power transmitter 120 for generating and transmitting the electromagnetic power signal. In some implementations, the electromagnetic power signal is varying magnetic field (e.g., produced by alternating current) generated by one or more transmitting coils 122 of the transmitter 120. For example, the transmitted power signal can be a varying magnetic field with a frequency in the radio-frequency (RF) range, for example, from 50 kHz to 500 kHz. In some implementations, the transmitted power signal may be an electromagnetic power signal with a frequency in the range of 4 MHz to 8 MHz.

The transmitter 120 of the charger 104 also includes a control module 121. The control module 121 can include one or more processors (e.g., one or more microcontrollers or other processing devices), as well as other hardware and software components (e.g., one or more memory systems, software modules, ASICs, FPGAs, etc.) for controlling operation of the transmitter 120.

The transmitter 120 also includes a communication module 123 for communicating with the wireless power receiver 110 of the device 102. The communication module 123 enables the transmitter 120 to exchange electronic information with the receiver 110 via a wireless data link. For example, the communication module 123 can enable the transmitter 120 to communicate data to the receiver 110 according to the Wireless Power Consortium (WPC) Qi standard by modulating the operating frequency of the transmitter using frequency shift keying (FSK). In some implementations, the communication module 123 may be a module that enables the transmitter 120 to communicate with the receiver 110 over another wireless data link (e.g., over a Bluetooth or Wi-Fi communication link according to the Alliance for Wireless Power (AW4P) Rezence standard, or another set of protocols).

The system 100 also includes the electronic device 102. The electronic device 102 can be, for example, a smartphone, a cellular phone, a tablet computing device, a wearable device (e.g., a smart watch or wearable health monitor), or another battery-powered electronic device capable of wireless power reception.

The device 102 includes a wireless power receiver 110, which is configured to generate an AC signal in response to the transmitted power signal. In some implementations, the receiver 110 includes one or more receiving coils 112 that, when in close proximity to the transmitting coil 122 (e.g., when the device 102 is positioned on a surface of the charger 104), inductively couples to the transmitting coil 122. Due to the inductive coupling between the coils, the AC magnetic field generated by the transmitting coil 122 induces an AC signal in the receiving coil 112, which can then be used to power the device battery 190.

The receiver 110 of the device 102 also includes a control module 111. Similar to the control module 121 of the transmitter 120, the control module 111 of the receiver 110 can include one or more processors (e.g., one or more microcontrollers or other processing devices), as well as other hardware and software components (e.g., one or more memory systems, software modules, ASICs, FPGAs, etc.) for controlling operation of the receiver 110.

The receiver 110 also includes a communication module 113 for communicating with the wireless power transmitter 120 of the charger 104. For example, the communication module 113 can modulate the reflected impedance of the receiver 110 using amplitude shift keying (ASK) to communicate information to the transmitter 120. In some implementations, the communication module 113 may communicate with the transmitter 120 using Bluetooth, Wi-Fi, or another wireless protocol.

The wireless power transmitter 120 and the wireless power receiver 110 can communicate any of various information required to perform safe, efficient wireless charging of the device 102. For example, the transmitter 120 and receiver 110 may exchange digital data coordinating communication (e.g., handshaking packets, identifying information), controlling charging (e.g., measured power levels, signal strength packets, foreign object detections, etc.), and/or other data for negotiating and maintaining wireless power transmission.

The foreign object 180 illustrated may represent an object that is inadvertently left on the surface of the charger 104. The foreign object 180 can be, for example, a coin, a key, or another metal object that absorbs a portion of the power transmitted by the charger 104.

As a safety precaution to prevent unsafe levels of heating of the object 180, the charger 104 is configured to cease transmitting power, or reduce a transmitted power level, if it detects that the power difference between the power transmitted by the charger 104 and the power received by the device 102 is more than the power difference threshold 125. The power difference threshold 125 can be determined by the charger 104 and/or the device 102, based on settings of the charger 104. In some implementations, the power difference threshold 125 is specified by a protocol used by the charger 104 and the device 102 (e.g., the WPC Qi standard) and indicates a power difference level that triggers the charger 104 to cease transmitting power to prevent potentially unsafe heating of the foreign object 180 near the charger 104.

In some implementations, the charger 104 adjusts the power difference threshold 125 to account for reasons for power difference other than absorption by any foreign object that may be present. For example, the charger 104 can increase the power difference threshold 125 to account for reduced coupling between the charger 104 and the device 102 that arises from lateral misalignment of the device 102 relative to the charger 104 (e.g., where the receiving coil 112 is not laterally well-aligned with the transmitting coil 122) and/or from a vertical misalignment between the receiving coil 112 and the transmitting coil 122 (e.g., where a device case or other intervening material results in a greater-than-expected separation between the receiving coil 112 and the transmitting coil 122). By adjusting the power difference threshold 125 to account for reasons for power difference other than the absorption by the foreign object 180, the system can prevent the charger 104 from ceasing to transmit power in instances where there is a significant power difference due to misalignment, but no foreign object is actually present. Similarly, the adjusted threshold may allow charging when a foreign object 180 is present but is not coupled to the extent that it reaches an unsafe level, e.g., when foreign object coupling alone does not violate the original power difference threshold, but the combination of misalignment and foreign object coupling does.

Figure 2:
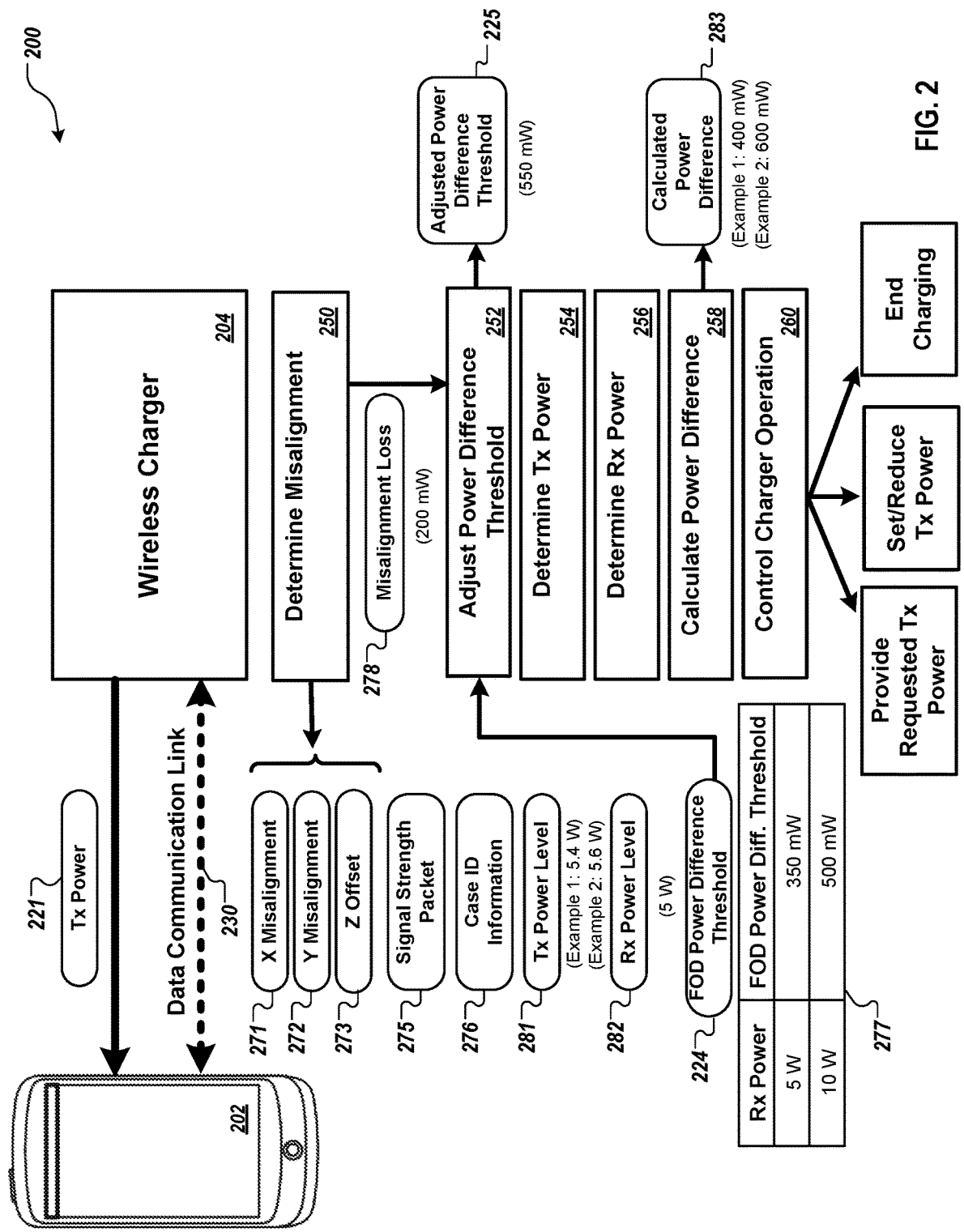
FIG. 2 is a block diagram illustrating an example of a system for controlling wireless charging.

FIG. 2 is a block diagram illustrating an example of a system 200 for controlling wireless charging. The system 200 includes a wireless charger 204 that provides transmitted power 221 to an electronic device 202. In addition to transmitting power 221, the charger 204 communicates with the device 202 via a data communication link 230, over which the charger 204 and the device 202 can exchange various electronic messages, requests, and data.

To prevent unsafe heating of any foreign objects that may be nearby, the system 200 is configured to limit the power 221 transmitted by the charger 204 if too great of a power difference is detected. The system can determine the difference between the power transmitted by the charger 204 and the power received by the device 202, and can detect the presence of a foreign object if the difference exceeds a threshold. The determined power difference 283 represents the combination of power absorbed by any foreign object with power difference due to other factors, including misalignment between the device 202 and the charger 204.

To better control the operation of the charger 204 and avoid terminating charging due to misalignment, the system 200 (e.g., the device 202 and/or the charger 204) generates an adjusted power difference threshold 225 that accounts for misalignment. To generate the adjusted threshold 225, the system 200 determines a misalignment between the device 202 and the charger 204 and, based on the misalignment, calculates a power difference due to the misalignment (e.g., a misalignment loss 278). Using the misalignment loss 278, the system 200 modifies a foreign object detection (FOD) power difference threshold 224 to generate the adjusted power difference threshold 225.

The system 200 (e.g., device 202 and/or the charger 204) compares the power difference 283 to the adjusted threshold 225. Based on comparing the power difference 283 to the adjusted threshold 225, the system 200 can control charger operation, e.g., to continue charging, adjust the level of transmitted power, or to terminate charging. For example, the system 200 can cease power transmission by the charger or reduce the level of power transmitted by the charger if the power difference is greater than the adjusted power difference threshold 225.

FIG. 2 illustrates steps 250 through 260 for controlling wireless charging. Though described below as being performed by a particular device (e.g., the wireless charger 204 or the device 202), it should be understood that any operation can be performed by either the wireless charger 204, the device 202, or a combination of the charger 204 and the device 202.

Figure 3A:
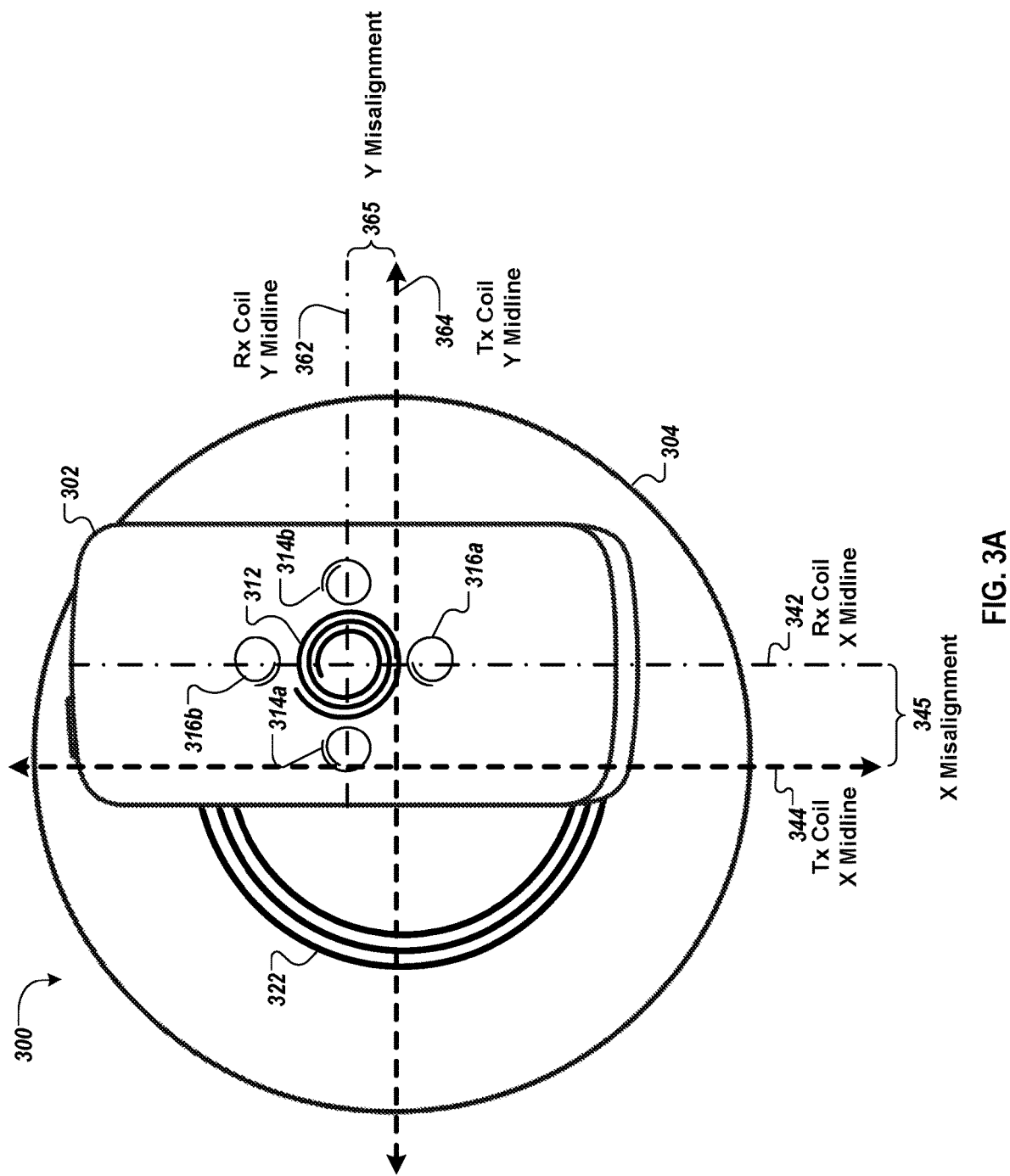
FIG. 3A is a diagram illustrating lateral misalignment between a charger and a device in a system for controlling wireless charging.

In step 250, the system 200 determines a misalignment between the device 202 and the charger 204 and, based on the determined misalignment, generates a misalignment loss value 278. In some implementations, the misalignment is determined to include a lateral offset (e.g., a lateral physical distance) between a preferred position of the device 202 relative to the charger 204 and actual position of the device 202 relative to the charger. The preferred position may be, for example, a position where the center of the receiving coil of the device 202 is aligned with the center of the transmitting coil of the charger 204. An example of a device 202 and a charger 204 with a non-zero misalignment is shown in FIG. 3A.

In some implementations, the device 202 measures one or more lateral misalignment values, where each misalignment value indicates an amount of physical offset (e.g, a distance) between the preferred position and the actual position of the device 202 relative to the charger 204. For example, the device 202 can measure an X misalignment 271 and a Y misalignment 272, where the X misalignment 271 indicates a distance between the preferred position and the actual position of the device 202 relative to the charger 204 along a first lateral axis (e.g., an X-axis) and the Y misalignment 272 indicates a distance between the preferred position and the actual position of the device 202 relative to the charger along a second lateral axis (e.g., a Y-axis) that is perpendicular to the first lateral axis. The lateral misalignment values can take on both positive and negative values, with the sign of the value indicating the direction of the misalignment (e.g., a positive X misalignment 271 may indicate that the device 202 is to the right of the preferred position, while a negative X misalignment 271 may indicate that the device 202 is to the left of the preferred position).

The device 202 can measure the lateral misalignments 271, 272 by any of various methods. In some implementations, the device 202 measures the misalignments 271, 272 using one or more pairs of alignment coils included in the device 202, as described in FIGS. 3A through 3C.

The system 200 can also determine a vertical misalignment value (e.g., a Z offset 273) that indicates a vertical separation between the device 202 and the charger 204 that is greater than a preferred, or an expected, separation between the device 202 and the charger 204.

Figure 4:
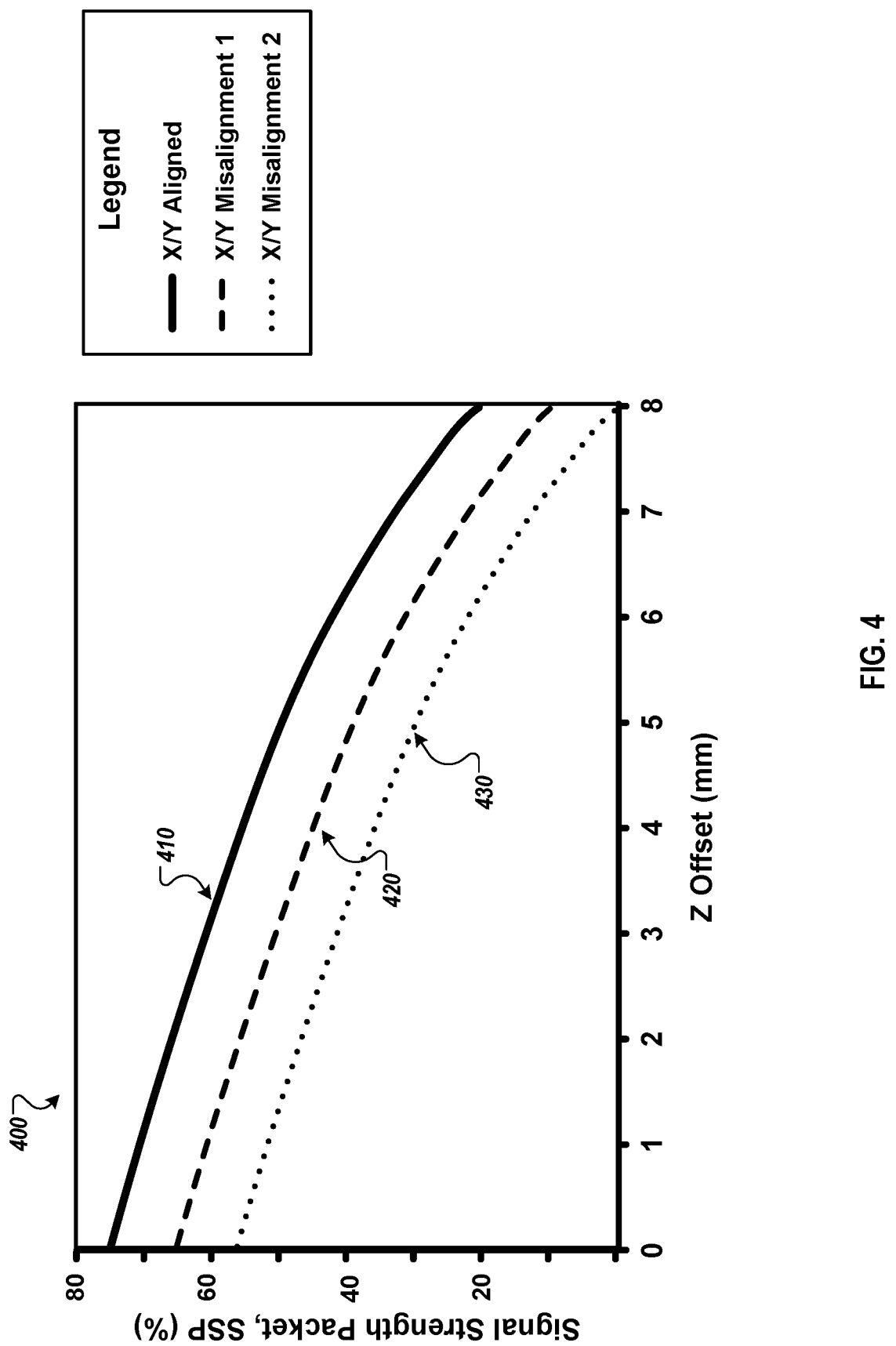
FIG. 4 is a chart illustrating relationships between a calculated vertical misalignment and a measured lateral misalignment.

The Z offset 273 can be determined by the system 200 by any of various methods. In some implementations, the charger 204 determines the Z offset 273 based on a signal strength packet 275 provided by the device 202. The signal strength packet 275 includes information indicating a level of coupling between the device 202 and the charger 204, where the level of coupling can be associated with the separation between the receiving coil of the device 202 and the transmitting coil of the charger 204. In some examples, the charger 204 can refine the determined Z offset 273 (e.g., improve the accuracy of the determination) by adjusting the determined Z offset 273 indicated by the signal strength packet 275 using the measured X misalignment 271 and Y misalignment 272, as shown in FIG. 4.

In some implementations, the system 200 determines the lateral and/or vertical misalignments based on one or more properties of a case or enclosure attached to the device 202. For example, the device 202 can receive case identifying information 276 that indicates one or more properties of the case surrounding the device 202. In some implementations, a user of the device 202 inputs case identifying information 276 (e.g., a case identifier, a brand, a thickness for the case, a type of material for the case) through a user-interface of the device 202, and from the identifying information 276, the device 202 determines the X misalignment 271, the Y misalignment 272, and/or the Z offset 273 (e.g., by setting the Z offset 273 to the thickness of the case, or by accessing a database or look-up table that correlates a particular case identifier with the Z offset 273). In some implementations, the system 200 determines the lateral and/or vertical misalignment based on both measurements (e.g., a lateral misalignment measurement, a signal strength packet 275) and case identifying information 276.

Figure 5:
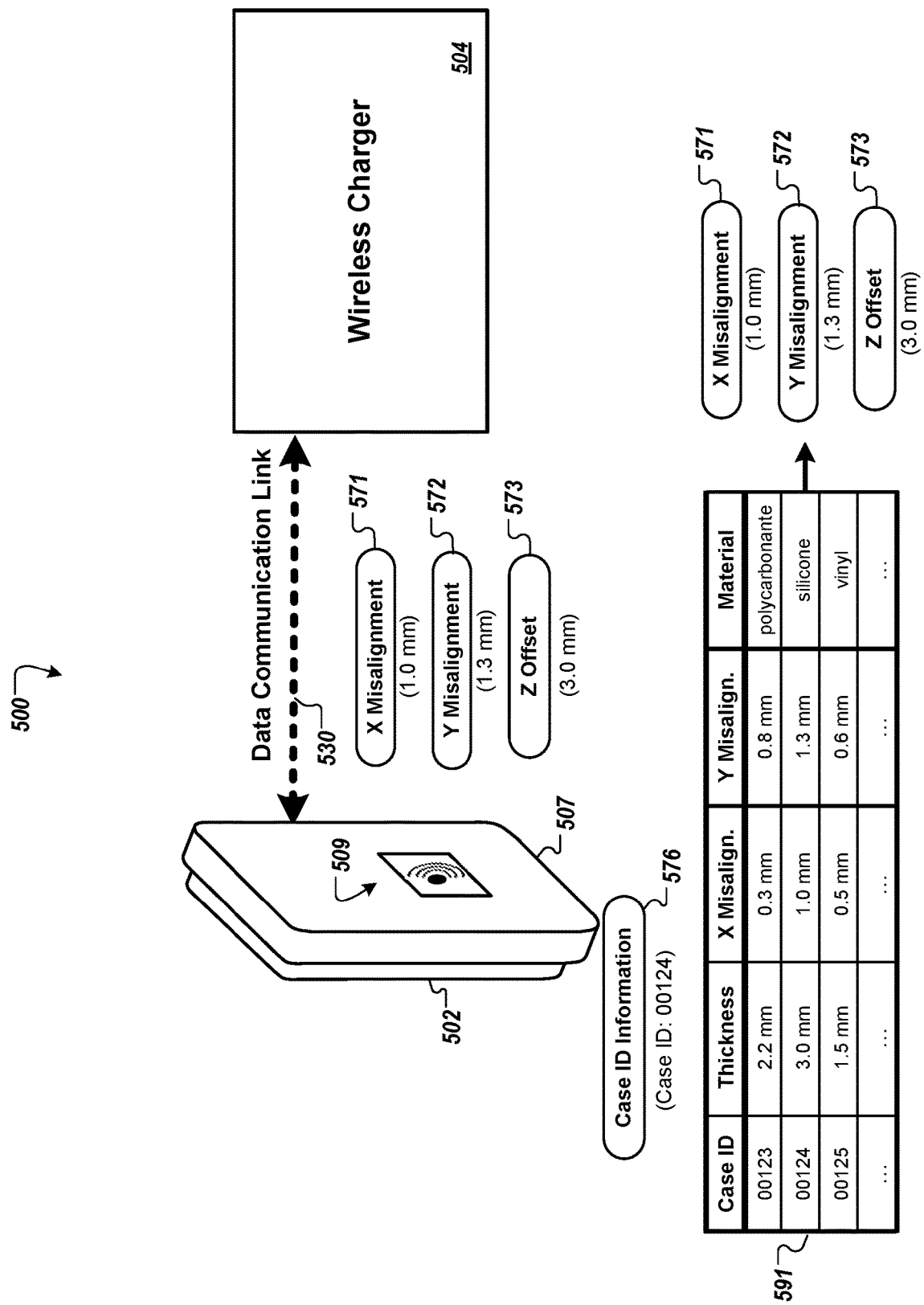
FIG. 5 is a diagram illustrating a system for controlling wireless charging using a device case with an identifying tag.

In some implementations, the system 200 determines the case identifying information from a radio-frequency ID (RFID) tag on the case of the device 202. For example, the case can include an RFID tag that communicates case identifying information 276 to the device 202 or to the charger 204 through near-field communication. The system 200 can use the case identifying information 276 to determine the thickness of the case, the dimensions of the case, or other case properties to determine the X misalignment 271, the Y misalignment 272, and/or the Z offset 273. An example of using an RFID tag for communicating case identifying information in a system for controlling wireless charging is shown in FIG. 5.

Based on the determined misalignment, the system 200 generates a misalignment loss value 278 that represents the power difference due to the reduced coupling that arises from the difference between the actual and preferred positions of the device 202 relative to the charger 204. The misalignment loss value 278 can be generated based on the lateral misalignment (e.g., the X misalignment 271 and/or the Y misalignment 273), the vertical misalignment (e.g., the Z offset 273) or both the lateral and the vertical misalignments. In some implementations, the device 202 provides the misalignment values (e.g., the X misalignment 271, the Y misalignment 273, and/or the Z offset 273 to the charger 204 over the data communication link 230, and the charger 204 then generates the misalignment loss 278 based on the values. In some implementations, the device 202, itself, generates the misalignment loss 278 based on the measured misalignment values. If the device 202 generates the misalignment loss 278, it may subsequently provide the loss 278 to the charger 204 (e.g., over the communication link 230).

In the example of FIG. 2, the misalignment loss value 278 indicates an estimated power difference or estimated power loss due to misalignment of 0.2 W. This calculation may be based on the transmitted or received power level, since the estimated difference due to misalignment may be scaled based on the level of power being transmitted. As another example, the misalignment loss value 278 may be expressed in a form that does not represent an absolute power measurement. For example, the misalignment loss values 278 may be expressed as a percentage of transmitted or received power that is expected to be lost due to misalignment, e.g., 2% of transmitted power expected to be lost due to non-ideal coupling due to misalignment. As discussed below, various tables and other data structures may be used to look up misalignment loss values 278 for the estimated level of misalignment.

In step 252, based on the generated misalignment loss value 278, the system 200 adjusts a foreign-object-detection (FOD) power difference threshold 224 to generate an adjusted power difference threshold 225. In the example, the power difference threshold 224 represents an initial or baseline power difference level at which the system 200 is configured to stop charging to prevent potentially unsafe heating of any foreign objects that may be present.

In some implementations, the charger 204 sets the adjusted power difference threshold 225 based on the misalignment loss 278 and the initial or baseline FOD power difference threshold 224. The FOD power difference threshold 224 may indicate a power difference that, if detected, would trigger the charger 204 to block or terminate wireless charging. The power difference threshold 224 may be specified by a wireless charging protocol or standard used by the system 200 (e.g., the Qi standard). In some implementations, the power difference threshold 224 may be different for different settings of the charger 204. For example, the power difference threshold 224 may be different for different transmission power levels of the charger 204. In the example of FIG. 2, the charger 204 determines the power difference threshold 224 by accessing a look-up table 277 stored in a memory system of the charger 204. The look-up table 277 associates the power difference threshold 224 with a particular power setting for the device/charger pair. The power setting can, for example, be determined by the charger 204 based on communications between the device 202 and the charger 204 via the communication link 230 (e.g., during a negotiation phase prior to the initiation of charging, during which the device 202 requests a particular received power level).

The adjusted power difference threshold 225 may be determined by adding an amount of power indicated by the expected misalignment loss value 278 to the FOD power difference threshold 224. For example, if the threshold 224 is 500 mW and the misalignment loss value 278 indicates 200 mW, the adjusted power difference threshold 225 can be set at 700 mW. As another example, the FOD power difference threshold 224 may be scaled up using a weighting factor based on the expected misalignment loss value 278.

As discussed further below, the system 200 is configured to control the operation of the charger 204 based on the adjusted power difference threshold 225 and the power difference 283, where the power difference is the difference between the power transmitted by the charger 204 and the power received by the device 202. For example, depending on the adjusted power difference threshold 225 and the power difference 283, the charger 204 may be controlled to provide power at the level requested by the device 202, provide power at a lower level than requested, or to terminate charging.

To calculate the power difference, in step 254 the system 200 determines a transmitted power level 281 that indicates the amount of transmitted power 221 generated by the charger 204 (e.g., an amount of power transmitted in magnetic fields generated by one or more transmitting coils of the charger 204). The transmitted power level 281 can, for example, be determined by the charger 204, itself. In some implementations, the determined power level 281 accounts for power dissipated by the circuitry of or housing of the charger's transmitter (e.g., by subtracting the power consumed by the transmitter circuitry, coil resistance, transmitter shielding, etc.), such that the transmitted power level 281 represents the power output by the charger 204 that is available to the device 202 and/or other objects within coupling range of the charger 204.

In step 256, the system 200 also determines a received power level 282 that indicates the amount of power received by the power receiver of the device 202. The received power level 282 can be measured by the device 202 and can account for power dissipated by the circuitry or housing of the receiver (e.g., by adding the power consumed by the receiver circuitry prior or the receiver shielding prior to the measurement), such that the received power level 282 represents the power generated by the transmitted magnetic fields coupled with the receiver of the device 202.

In some implementations, the charger 204 and the device 202 exchange information indicating the transmitted power level 281 and the received power level 282 using the data communication link 230, e.g., as information encoded in a packet. In some implementations, the data communication link 230, is provided through modulation of the power coupling between the charger 204 and device 202. For example, the device 202 may transmit data by modulating the way the coil responds to power signals (e.g., by adjusting impedance or other factors), and the wireless charger may communicate by modulating frequency, intensity, or other parameters of the transmitted signal. Communication may additionally or alternatively occur through other means, such as Wi-Fi, Bluetooth, and so on.

Initially, the device 202 may communicate to the charger 204 a particular desired power level to be received (e.g., 5 Watts), as well as a measured received power level 282. The charger 204 may then increase its transmitted power level 281 until the measured received power level 282 reaches the desired received power level. In this case, the transmitted power level 281 may be greater than the received power level 282 due to any of various factors, such as non-ideal coupling between the device 202 and the charger 204 due to misalignment, coupling with a foreign object, or other factors.

In some implementations, the charger 204 can provide information indicating the transmitted power level 281 to the device 202, and/or the device 202 can provide information indicating the received power level 282 to the charger 204. In some implementations, the transmitted power level 281 and/or the received power level 282 are average power levels, that is, average power transmitted or received, respectively, over a particular period of time, or averaged over multiple measurement cycles. In some implementations, the transmitted power level 281 and/or the received power level 282 can be calibrated power levels, where the determined power levels 281, 282 are adjusted to compensate for other sources of power difference within the system 200.

In step 258, based on the determined transmitted power level 281 and received power level 282, the system 200 calculates the power difference 283, which represents the difference between the transmitted power level 281 and the received power level 282. The calculated power difference 283 includes power difference due to the misalignment between the charger 204 and the device 202 (e.g., the alignment loss 278), as well as any loss due to power absorption by a foreign object. The power difference 283 value can be calculated by the charger 204 and/or the device 202 and provided, if necessary, to the other via the data communication link 230.

Based on the calculated power difference 283 and the adjusted power difference threshold 225, the system can control charger 204 operation (step 260). The charger 204 may be controlled in several different ways depending on the values determined. If at the full power level requested by the device 202 the calculated power difference 283 is less than the adjusted power difference threshold 225, the charger 204 is controlled to provide the full amount of power requested by the device 202. This is done even if the calculated power difference 283 is greater than the initial FOD power difference threshold 224 that would otherwise cause charging to terminate. On the other hand, if the calculated power difference 283 is greater than the adjusted power difference threshold 225, the charger 204 may reduce the power transmitted below the level requested by the device 202 or may terminate charging altogether.

In some implementations, the charger 204 is controlled to end charging (e.g., cease providing power through the transmission coil) when the calculated power difference 283 is greater than the adjusted power difference threshold 225. For example, a power difference 283 that exceeds the adjusted power difference threshold 225 can indicate that, even accounting for expected power differences due to non-ideal device and charger coupling, a nearby foreign object may be absorbing an excessive amount of power transmitted by the charger 204 (e.g., an amount greater than the FOD power difference threshold 224). To prevent potentially unsafe heating of the object, the charger 204 can terminate further power transmission until the object 280 is removed or the charging configuration is modified.

In some implementations, if the system determines that the power difference 283 exceeds the power difference threshold 225, rather than ceasing power transmission, the system 200 reduces the level of power transmitted by the charger 204. In some configurations, the headroom for power difference is proportionally higher at lower transmitted power levels, since the absolute amount of power that may be absorbed by a foreign object is still acceptably low. For example, while the absolute amount of power difference may be lower for lower power transmission levels, the power difference as a percentage of transmitted power may be higher. Thus, but reducing transmission power, the charger 204 may be able to supply power to the device 202 at a transmission level where the power difference is acceptable for the new transmission power level, even though the power difference at the higher power transmission level was unacceptable.

In the example of FIG. 2, the device 202 requests to receive power of 5 Watts. Based on accessing the table 277, the charger 204 determines that for the current charging configuration (e.g., a received power of 5 Watts), the power difference threshold 224 is 350 mW, suggesting that power absorption above this level by a foreign object may be unsafe. The table 277 may indicate power different thresholds based on received power amounts and/or based on transmitted power amounts, and implementations may be designed to look up an appropriate threshold 224 based on either type of value.

The device 202 determines misalignment values (e.g., the X misalignment 271, Y misalignment 272, and/or Z offset 273) indicating the misalignment between the actual position and the preferred position of the device 202 relative to the charger 204, and provides those values to the charger 204 via the communication link 230. Based on the misalignment values, the charger 204 determines the misalignment loss value 278 to be 200 mW. The charger 204 can determine the misalignment loss 278, for example, by using an algorithm relating the misalignment values to the loss 278, by accessing a look-up table, or by another method. Alternatively, the device 202 can calculate and provide the misalignment loss value 278 over the communication link 230.

Based on the misalignment loss 278 of 200 mW and the power difference threshold 224 of 350 mW, the charger 204 determines the adjusted power difference threshold 225 to be 550 mW.

During charging, the charger 204 increases the transmitted power 281 until the received power level 282 is 5 Watts, as requested by the device 202. In a first example (indicated as "Example 1"), this involves transmitting 5.4 W, resulting in a calculated power difference 283 of 400 mW between what was transmitted and what was received. Although this difference 283 is greater than the FOD power difference threshold 224, which is 350 mW, it is less than the adjusted power difference threshold 224, which is 550 mW. As a result, the charger 204 is controlled to provide power up to the full amount requested by the device 202, e.g., 5 W received by the device 202. In this situation, it is likely that there is no foreign object coupled to the charger 204, or that any power lost to a foreign object is acceptably small (e.g., less than 350 mW, since at least 200 mW of the 400 mW is due to misalignment of the device 202 and charger 204).

In a second example (indicated as "Example 2"), the charger 204 must transmit 5.6 W in order to achieve the 5 W received power level at the device 202, resulting in a power difference 283 of 600 mW. Because the power difference 283 (600 mW) exceeds the adjusted power difference threshold 225 (550 mW), the charger 204 is controlled to reduce or terminate charging to avoid potentially providing unsafe power levels to a foreign object.

In some implementations, in response to determining that the power difference 283 exceeds the power difference threshold 225, the charger 204 ceases transmitting power. In some implementations, rather than ceasing power transmission, the charger 204 adjusts the transmitted power 221 to a new, reduced power level 285 such that the new power difference 283 does not exceed the adjusted power difference threshold 225 for that power level. For instance, the FOD power difference threshold 244 for 2.5 W of received power may be 250 mW, and the misalignment loss 278 may be expected to be about 100 mW at this lower power level, resulting in an adjusted power difference threshold 225 of 350 mW. If the device 202 is able to receive 2.5 W with transmitted power of 2.8 W, then the adjusted power difference threshold 225 would be satisfied. Thus, even though the adjusted power difference threshold 225 for the 5 W power level was not satisfied, the adjusted power difference threshold 225 for the 2.5 W power level would be satisfied. Although the 2.5 W power level is less than the device 202 requested, instead of terminating charging altogether the charger 204 can provide at least some power at this level (or at or near the highest level that the device 202 and/or charger 204 determine a corresponding adjusted power difference threshold is satisfied).

In some implementations, the charger 204 may receive a request from the device 202 for a particular desired received power level (e.g., 5 Watts). The charger 204 may perform various iterations of the techniques of FIG. 2 to arrive at approximately the highest power transmission level that can be supported given the current conditions. The charger 204 can gradually increase the transmitted power level 281 (e.g., in incremental steps) and assess the power difference 283 at different transmission power levels until the power difference 283 reaches a power difference threshold corresponding to that transmitted power level. Initially, the FOD power difference thresholds 224 may be used for comparison until one is reached, though the adjusted power difference threshold 225 could be used at each step if desired. Transmitted power can be incremented further until either the received power reaches the amount requested by the device 202, or until the power difference 283 reaches the adjusted power difference threshold 225 for the current transmitted power level, or until the power difference 283 is within a predetermined margin of the adjusted power difference threshold 225. In this way, the charger 204 can increase the transmitted power level 281 to a maximum power level that charges the device 202 while preventing any foreign object from absorbing an excessive amount of power.

In many instances, no foreign object is actually present, and the difference between transmitted power and received power are simply due to misalignment, inefficiencies, or other factors that do not impact safety. The techniques herein can help charging proceed despite these factors, when foreign object detection thresholds would otherwise inappropriately halt charging. Similarly, even if the full requested amount of power cannot be delivered to a device within the appropriate thresholds, the system can enable charging at a lesser level, up to or near the maximum level of charging that can be supported under current conditions and still remain within applicable power difference thresholds.

Steps 250 through 260 can be performed at various times within the charging process. For example, the some or all of the operations (e.g., steps 250 and 252 to determine the adjusted power difference threshold 225) can be performed before power transfer is initiated (e.g., during a negotiating phase between the device and the charger), or while power transfer has been paused (e.g., in a renegotiation phase). The operations can also be performed during power transfer, that is, they can be performed periodically while the charger 204 is transmitting power to the device to determine whether a new foreign object 280 has been introduced, the alignment between the device 202 and the charger 204 has changed, or the power difference 283 has exceeded the power difference threshold 285. For example, the system 200 may perform some or all of steps 254 through 260 at periodic time intervals during charging.

Similarly, the charger 204 and/or the device 202 may perform the functions shown for FIG. 2. For example, in some implementations, the device 202 may use a comparison of the calculated power difference 283 and adjusted power difference threshold 225 to determine that it should reduce the amount of power it requests, or even to request termination of wireless charging, and thus control the wireless charger 202.

FIG. 3A is a diagram illustrating a lateral misalignment between a charger 304 and a device 302 in a system 300 for controlling wireless charging. The charger 304 includes a transmitting coil 322 that is a part of the charger's wireless power transmitter. Seated on a flat top surface of the charger 304 is an electronic device 302, which includes a receiving coil 312 that is part of the device's wireless power receiver. Because the receiving coil 312 is not directly above the transmitting coil 322, the device 302 is considered misaligned relative to the charger 304. The device 302 also includes alignment coils 314a, 214b, 316a, and 316b, which provide data the device 302 can use to measure the extent of the misalignment.

In some implementations, a preferred position of the device 302 relative to the charger 304 (e.g., for maximum power transfer efficiency) occurs when the device 302 is positioned such that the center of the device's receiving coil 312 is aligned with (e.g., directly above) the center of the charger's transmitting coil 322. In FIG. 3A, the center of each coil is indicated by the intersection of the X and Y midlines of each coil, e.g., the intersection of the dot-dashed midlines 342 and 362 for the receiving coil 312 and the intersection of the dashed midlines 344 and 364 for the transmitting coil 322. As a result, the preferred position of the device 302 relative to the charger 304 in this example occurs when the device 302 is positioned such that the intersection of the midlines 342 and 362 (e.g., the center of the receiving coil 312) coincide with the intersection of the midlines 344 and 364 (e.g., the center of the transmitting coil 322).

In FIG. 3A, the device 302 is positioned on the surface of the charger 304 such that the center of the receiving coil 312 is offset from the center of the transmitting coil 322, resulting in a lateral misalignment of the coils along both a primary axis (e.g., the X misalignment 345) and along a secondary axis (e.g., the Y misalignment 365). The lateral misalignment of the transmitting coil 322 and the receiving coil 312 results in reduced inductive coupling between the coils and thus a reduced power transfer efficiency, leading to an increased loss in power transferred relative to the case where the device 302 and the charger 304 are in the preferred position and the coils align.

In some implementations, in addition to the receiving coil 312, the device 302 includes one or more alignment coils 314a, 314b, 316a, 316b for measuring the extent of the lateral misalignment between the device 302 and the charger 304. The device 302 can include one pair of alignment coils along a single axis or multiple pairs of alignment coils, where each pair is along a different axis that intersects the center of the receiving coil 312. In some examples, there may be more than two alignment coils along a single axis (e.g., three, four, or more alignment coils). In the example of FIG. 3A, the device 302 includes two pairs of alignment coils: a first pair of alignment coils, 314a and 314b, along a primary (e.g., X) axis, and a second pair of alignment coils, 316a and 316b, along a secondary (e.g., Y) axis that is perpendicular to the primary (e.g., X) axis.

The alignment coils 314a, 314b, 316a, 316b can be any of various types of coils. For example, the coils 314a, 314b, 316a, 316b can be substantially planar coils formed by wire windings. In some implementations, the coils 314a, 314b, 316a, 316b are formed by metallic thin films (e.g., a metallization layer of a printed circuit board). The alignment coils 314a, 314b, 316a, 316b can have any number of windings, but in some implementations, the coils 314a, 314b, 316a, 316b may have fewer windings that the receiving coil 312. For example, the alignment coils 314a, 314b, 316a, 316b may have a single or a few (e.g., less than five) windings. In general, the alignment coils 314a, 314b, 316a, 316b need not be the same (e.g., same material, diameter, number or spacing of windings, etc.). In some implementations, however, two alignment coils of a pair of coils positioned along a same axis (e.g., coils 314a and 314b, or coils 316a and 316b) are substantially the same (e.g., same diameter, number and spacing of windings, etc.).

The alignment coils 314a, 314b, 316a, 316b are positioned such that their centers are offset from the center of the receiving coil 312. In some implementations, the center of two coils of a pair of alignment coils are offset from the center of the receiving coil 312 by equal amounts in opposite directions along a same axis. For example, in FIG. 3A, the coils 314a and 314b of the first pair of alignment coils are positioned such that their centers are offset from the center of the receiving coil 312 by an equal amount in opposite directions along the X axis. Similarly, the coils 316a and 316b of the second pair of alignment coils are positioned such that their centers are offset from the center of the receiving coil 312 by an equal amount in opposite directions along the Y axis.

In some implementations, the alignment coils 314a, 314b, 316a, 316b are positioned such that the coils do not overlap in space with the receiving coil 312. In other implementations, a portion of one or more of the alignment coils 314a, 314b, 316a, 316b may overlap in space with one or more windings of the receiving coil 312.

In some implementations, the two coils of a pair of alignment coils may be wound in a same orientation (e.g., clockwise or counterclockwise). In other implementations, the two coils of a pair of alignment coils may be wound in different (e.g., opposite) orientations.

The alignment coils 314a, 314b, 316a, 316b are configured such that, when device 302 is positioned on the charger 304 and the charger's transmitting coil 322 generates an AC magnetic field, the coils inductively couple to the field, inducing an AC signal (e.g., current and voltage) in each coil 314a, 314b, 316a, 316b.

The magnitude of the AC voltage induced in each coil 314a, 314b, 316a, 316b depends on the extent of physical overlap between the alignment coil 314a, 314b, 316a, 316b and the transmitting coil 322, which in turn depends on the lateral distance between the center of each alignment coil 314a, 314b, 316a, 316b and the center of the transmitting coil 322. As a result, the difference between the voltages induced in two coils of a pair of coils can indicate the lateral misalignment of the device 202 along the axis defined by the two coils.

Figure 3B:
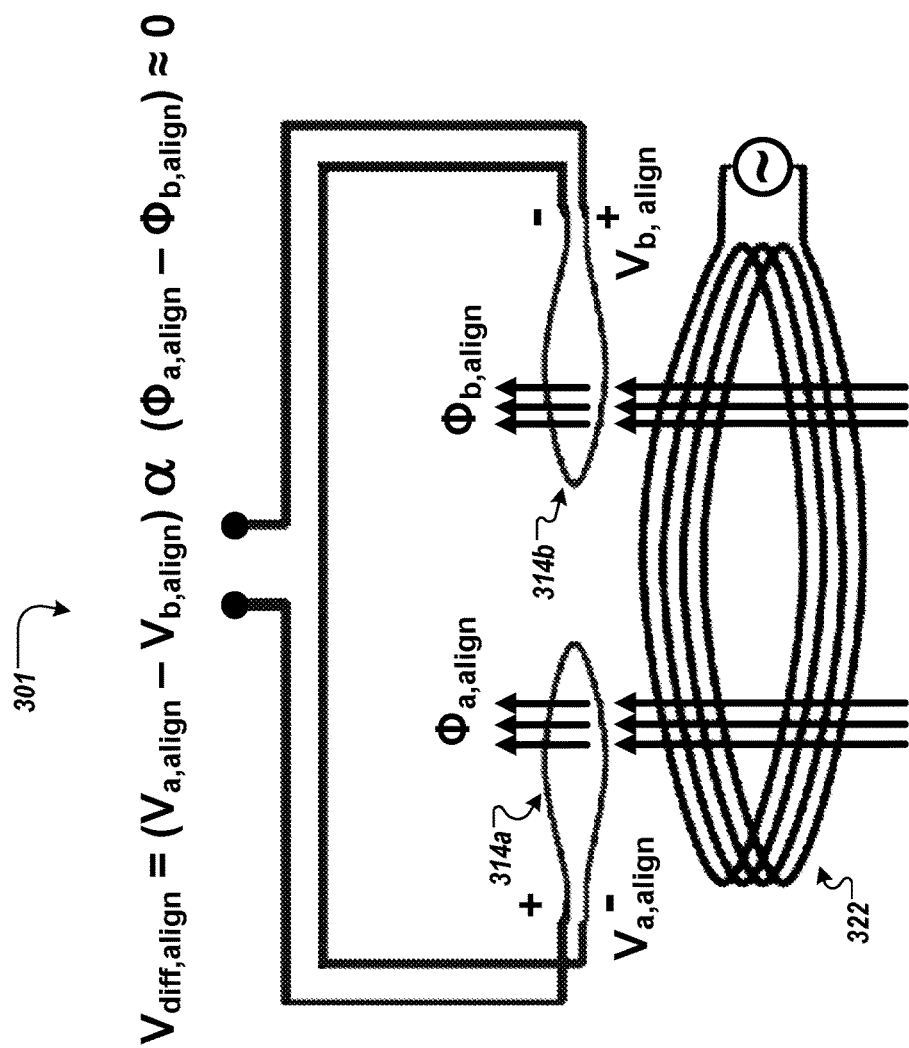
FIGS. 3B and 3C are diagrams illustrating examples of a lateral misalignment measurement using a pair of alignment coils in a system for controlling wireless charging.

FIG. 3B is a diagram illustrating an example 301 of a lateral misalignment measurement using the pair of alignment coils 314a, 314b where the device 302 is aligned with a charger 304 (e.g., the device 302 is located in the preferred position). FIG. 3B includes the transmitting coil 322 of the charger 304 of system 300, as well as the alignment coils 314a and 314b of the device 302.

In FIG. 3B, each alignment coil 314a, 314b includes a single winding in a same orientation, where the center of each alignment coil 314a, 314b is offset a same distance from the center of the receiving coil (not shown), but offset in opposite directions along an axis that intersects the center of the receiving coil. During charging, the alignment coils 314a, 314b couple to the transmitting coil 322, such that the electromagnetic power signal generated by the transmitting coil 322 generates magnetic fluxes $\phi_{a,align}$ and $\Phi_{b,align}$ through the coils 314a and 314b, respectively. The fluxes $\Phi_{a,align}$ and $\Phi_{b,align}$ further induce AC voltages $V_{a,align}$ and $V_{b,align}$ in the coils 314a and 314b. In FIG. 3B, the alignment coils 314a, 314b are electrically connected such that a voltage signal $V_{diff,align}$ can be measured, where the voltage signal $V_{diff,align}$ represents the difference in the voltage between the AC voltages induced in the coils 314a, 314b (e.g., $V_{diff,align} = V_{a,align} - V_{b,align}$).

In example 301, the device 302 is located in the preferred position relative to the charger, such that the center of the receiving coil, which is located at a midpoint between the alignment coils 314a, 314b, is aligned with (e.g., located directly above) the center of the transmitting coil 322. As a result, the alignment coils 314a, 314b are laterally offset from the transmitting coil by a same distance, but in opposite directions. Because the coils 314a, 314b are offset by a same distance from the transmitting coil 322, the magnetic fluxes $\Phi_{a,align}$ and $\Phi_{b,align}$ through coils 314a and 314b, respectively, are equal in magnitude and induce AC voltages $V_{a,align}$ and $V_{b,align}$ that are also are equal in magnitude. As a result, the measured differential voltage, $V_{diff,align}$ is zero for the example where the receiving coil is aligned with the transmitting coil 322.

Figure 3C:
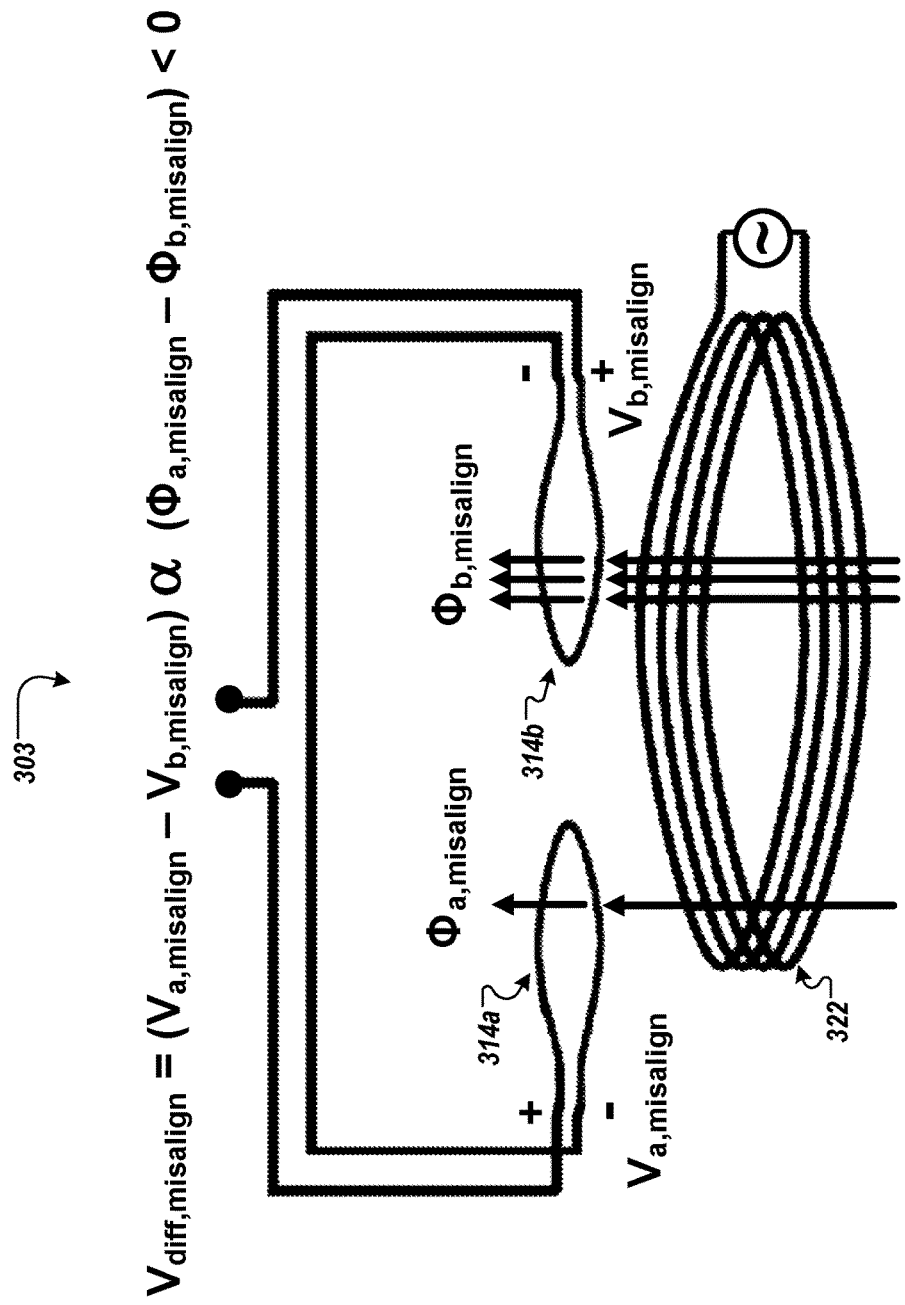

FIG. 3C is a diagram illustrating an example 303 of a lateral misalignment measurement using the pair of alignment coils 314a, 314b where the device 302 is misaligned with the charger 304. The coils 314a, 314b of FIG. 3C retain the same configuration and electrical connection as in FIG. 3B, that is, the coils 314a, 314b each includes a single winding in a same orientation, where the center of each alignment coil 314a, 314b is offset a same distance from the center of the receiving coil (not shown), but offset in opposite directions along an axis that intersects the center of the receiving coil, and the measured voltage signal, $V_{diff,misalign}$, represents the difference in the voltage between the AC voltages induced in the coils 314a, 314b (e.g., $V_{diff,misalign} = V_{a,misalign} - V_{b,misalign}$).

In example 303, the device 302 is not located in the preferred position relative to the charger. As a result, the center of the receiving coil (e.g., the midpoint between the alignment coils 314a, 314b) is laterally offset relative to the center of the transmitting coil 322. As a result, the alignment coils 314a, 314b are laterally offset from the transmitting coil by different distances, and the magnetic fluxes generated through the coils, $\Phi_{a,misalign}$ and $\Phi_{b,misalign}$, are of different magnitudes. As a result, the induced AC voltages $V_{a,misalign}$ and $V_{b,misalign}$ are also of different magnitudes and the measured differential voltage, $V_{diff,misalign}$ is non-zero.

The magnitude and sign of the differential voltage, $V_{diff,misalign}$, indicate the direction and extent of lateral misalignment between the device and the charger. In general, a greater voltage is induced in the alignment coil that spatially overlaps more with the transmitting coil 322 (e.g., alignment coil 314b in example 303). The measured differential voltage, $V_{diff,misalign}$, can then be used to determine a physical misalignment (e.g., a physical distance between the actual position and the preferred position). For example, the system may calculate the misalignment using an algorithm, a look-up table, or another method.

In practical implementations, due to non-idealities within the system (e.g., imperfections in the positioning of the coils 314a, 314b; unintentional differences between the coils 314a, 314b), the differential voltage for a device in the preferred position may not equal exactly zero. In some implementations, the system can account for non-idealities by performing a calibration to determine one or more correction values to apply to the differential voltage measurement, or by applying other correction measures.

Similarly, though the alignment coils 314a, 314b of examples 301 and 303 are substantially similar (e.g., same number of windings, wound in the same orientation), in general, each coil in a pair of coil can be different, with differences in induced voltages related to differences in the coils corrected by an initial calibration step.

Other electrical connections or configurations are also contemplated within the scope of this disclosure. For example, in some implementations, voltages induced by in the alignment coils may be measured individually and the difference calculated in a subsequent step (e.g., digitally). In some implementations, the coils of a pair of alignment coils may be wound in opposite directions such that the voltages induced by the transmitted power signal are of opposite polarity. In this case, the system may measure or calculate a voltage sum rather than a voltage difference to measure the misalignment. In some implementations, rather than a pair of misalignment coils, the device may include a set of three alignment coils that define a plane (e.g., configured in a triangular arrangement) and, based on the induced voltages, determine misalignment along more than one axis.

In some implementations, an expected amount of power difference due to misalignment may be estimated based on X and Y offsets alone, e.g., using a table or function that indicates correlation of X and Y misalignments with power loss. This may be implemented as calibration table, which may be based on empirical data for a given charger and device combination. The table may map different [X,Y] offsets to power difference amounts, e.g., [0,0]—0 mW, [1,1]—50 mW, [1,2]—75 mW, etc. In some implementations, different tables may be used for different transmitted or received power levels, and/or for different device, chargers, and/or device/charger combinations.

FIG. 4 is a chart 400 illustrating relationships between a calculated vertical misalignment and a measured lateral misalignment. A system can use relationships such as those indicated in the chart 400 when calculating a vertical misalignment value (e.g., a Z offset) to improve the accuracy of the determined vertical misalignment.

As described above, an electronic device or a charger can determine a vertical misalignment between the device and the charger (e.g., a Z offset) that represents a greater-than-preferred (or greater-than-expected) vertical separation between the device and the charger. The Z offset can arise, for instance, due to the presence of a device case or other enclosure between the device and the charger. In some implementations, the charger determines the Z offset based on a signal strength packet (SSP) provided to the charger by the device. The data in the SSP (referred to as an "SSP value") indicates a level of coupling between the device and the charger determined by the device. In some examples, the charger can determine the Z offset based on relationships such as those shown in chart 400, which plots an estimated Z offset as a function of the SSP value. Generally, because the SSP represents a level of coupling between the device and the charger, a smaller SSP value indicates a greater separation between the device and the charger and thus a greater Z offset, as shown in curves 410, 420, and 430.

Because the SSP value represents the coupling between the device and the charger, it can depend not only on the Z offset, but also on the lateral misalignment between the device and the charger, which can alter the coupling. Generally, a greater amount of lateral misalignment results in a greater decrease in coupling and a smaller SSP value. To more accurately determine the Z offset by accounting for the lateral misalignment contribution to the decrease in coupling, the charger can access a series of curves, tables, or algorithms that describe the relationship between one or more lateral misalignments, a SSP value, and a Z offset.

The chart 400 illustrates an example of the types of relationships indicated by data that the charger may access when determining the Z offset. In particular, the charger can store or access data that indicates the nonlinearities between Z offset and signal strengths indicated by SSP values. The chart 400 includes three curves 410, 420, 430 that relate an estimated Z offset between the device and the charger to the SSP value determined by the device. The solid curve 410 indicates a relationship between the estimated Z offset and the SSP value when the device and the charger are aligned in the X and Y directions. Here, the coupling represented by the SSP value is due primarily to the separation between the device and the charger (e.g., the Z offset).

The dashed curve 420 indicates a relationship between the estimated Z offset and the SSP value when the device and the charger are slightly laterally misaligned (e.g., X/Y Misalignment 1). The lateral misalignment can be in either an X direction, a Y direction, or both an X and Y direction. The lateral misalignment between the device and the charger decreases the coupling between the two. As a result, when compared to an aligned device and charger, a particular SSP value will map to a smaller Z offset.

The dotted curve 430 indicates a relationship between the estimated Z offset and the SSP when the device and the charger have a greater lateral misalignment (e.g., X/Y Misalignment 2, where X/Y Misalignment 2 is greater than X/Y Misalignment 1). The greater lateral misalignment results in a greater decrease in coupling between the device and the charger and, as a result, when compared to the device and charger that are more aligned, a particular SSP value will map to an even smaller Z offset.

As shown by the different curves in plot 400, the charger can account for the way that X and Y misalignment affect SSP when determining the Z misalignment value. Thus, the Z misalignment may be calculated as a function of the X misalignment, the Y misalignment, and the signal strength indicated by the SSP. For example, the charger or charged device may use the X and Y misalignment data to select data for one of the curves 410, 420, and 430 (e.g., by selecting from among different files, data sets, tables, columns of a table, equations, etc. representing the relationship different relationships). The selected data may then be used to determine a mapping of the signal strength indicated by the SSP to a Z misalignment value. Then, the X, Y, and Z misalignment values may be used to look up an expected power difference due to misalignment from a table that associates power difference values with different combinations of X, Y, and Z misalignments.

Though three curves 410, 420, and 430 are included in plot 400, in should be understood that any appropriate number of different X and Y alignments may be included in the data accessed by the charger or charged device to determine the Z offset. In some implementations, the device, rather than the charger, may determine the Z offset using information related to the lateral misalignment. By accounting for the lateral misalignment when estimating the Z offset, the system can more accurately determine the actual vertical misalignment between the device and the charger.

FIG. 5 is a diagram illustrating a system 500 for controlling wireless charging using a device case with an identifying tag. The system 500 includes an electronic device 502 and wireless charger 504 such as those described above. Attached to the device 502 is a case 507. The case 507 includes an identifying tag 509, which can be, for example, an RFID tag. The identifying tag 509 provides case identifying information 576 to the device 502, which the device 502 can then use to determine a lateral and/or vertical misalignment between the device 502 and the charger 504 (e.g., the X misalignment 571, the Y misalignment 572, and/or the Z offset 573).

The case 507 can be any of various structures that attach to the device 502. For example, the case 507 can be an enclosure that surrounds the device 502 to physically protect the device 502 (e.g., from damage due to a drop, etc.). The case 507 can include any of various materials, including plastics such as polycarbonate, silicone, or vinyl. In some examples, the case 507 can introduce a misalignment between the device 502 and the charger 504. For example, the thickness of the case can introduce a vertical misalignment (e.g., a Z offset 573) between the device 502 and the charger 504. For a wireless charger 504 that is a charging stand, the dimensions of the case 507 can introduce a lateral misalignment (e.g., a X misalignment 571 and/or a Y misalignment 572) between the device 502 and the charger 504.

The case 507 includes the identifying tag 509. The tag 509 can be integrated into the case 507, attached to the case 507, or otherwise a part of the case 507. The tag 509 includes identifying information 576 related to the case 507 that can be communicated to the device 502. For example, the tag 509 can be an RFID tag or another tag device that communicates via near-field communication. The tag 509 can be passive or active (e.g., a passive RFID tag).

When attached to the device 502, the tag 509 communicates the case identifying information 576 to the device 502, e.g., through near-field communication or other low power communication techniques. The case identifying information 576 can include, for example, a case identifier, a brand, a dimension of the case 507, a thickness for the case 507, a type of material for the case 507, or another property of the case 507. Based on the case identifying information 576, the device 502 can determine a lateral and/or vertical misalignment for the device/charger system, for example, by accessing a look-up table 591 that associates various values of the case identifying information 576 with one or more misalignment values. In the example of FIG. 5, based on the case identifier provided by the tag 509 in the case identifying information 576, the device 502 access the look-up table 591 that includes information related to various case identifiers and determines that the thickness of the case is 3.0 millimeters and thus sets the Z offset 573 to 3.0 millimeters. The device 502 also determines that the expected X misalignment 571 is 1.0 mm and the expected Y misalignment is 1.3 mm. The device 502 can then provide the determined X misalignment 571, Y misalignment 572, and Z offset 573 to the wireless charger 504, for instance, through the data communication link 530.

In some implementations, the device and/or the charger may use artificial intelligence and/or machine learning models to determine a misalignment of the system. For example, the device or the charger may track and/or store various historical data related to the device, such as whether the device usually has a case attached, or whether the device is typically positioned in a particular location on the charger or in a particular orientation. The device or the charger may track and/or store indications of recent or typical power difference levels, as well as whether there is typically a misalignment for the device and if so by what amount (e.g., the device is typically placed two to four millimeters to the right of the preferred position). The device or the charger can then use the historical data to estimate a power difference level for the device.

For example, one user may be somewhat careless with aligning his phone with the charger, or the phone may often slide out of position, so that the phone consistently has a higher loss than the charger's typical initial power difference threshold would permit. This trend of higher-than-average loss can be detected and recorded. Then, based on the historical trend for the user or the phone, the phone and/or charger may determine that a loss experienced in the current charging session, while high, is within the typical range for the user or phone, and so does not represent the presence of a foreign object. As a result, based on the historical trend, the adjusted power difference threshold can be increased or otherwise set according to the typical loss experienced by the device. This allows the device and/or charger to adapt the power difference threshold level to charging trends. One advantage of this is that even if the device does not have alignment coils or does not have information about the dimensions of a phone case, the amount of power difference due to misalignment may be inferred from the historical power difference trend.

In some implementations, the device may include one or more sensors that provide information the device and/or charger use to determine a misalignment for the device relative to the charger and/or whether a foreign object is present. For example, the device may include a sensor (e.g., a proximity sensor) that detects whether a case is present and, if so, uses information from the detection to determine a vertical misalignment (e.g., a Z offset) due to the case.

In some implementations, the device includes a camera which can be accessed to provide images of areas near the device and the charger. The device may process the images to determine whether there is a foreign object within coupling distance of the charger (e.g., on a top surface of the charger). In some implementations, the device and/or the charger may include a dedicated metal-detector that can determine whether there is a foreign object near the charger that may absorb transmitted power. If any foreign object is detected, the device and/or the charger can provide a message to a user requesting that the object be removed (e.g., through a graphical user interface of the device or the charger).

Figure 6:
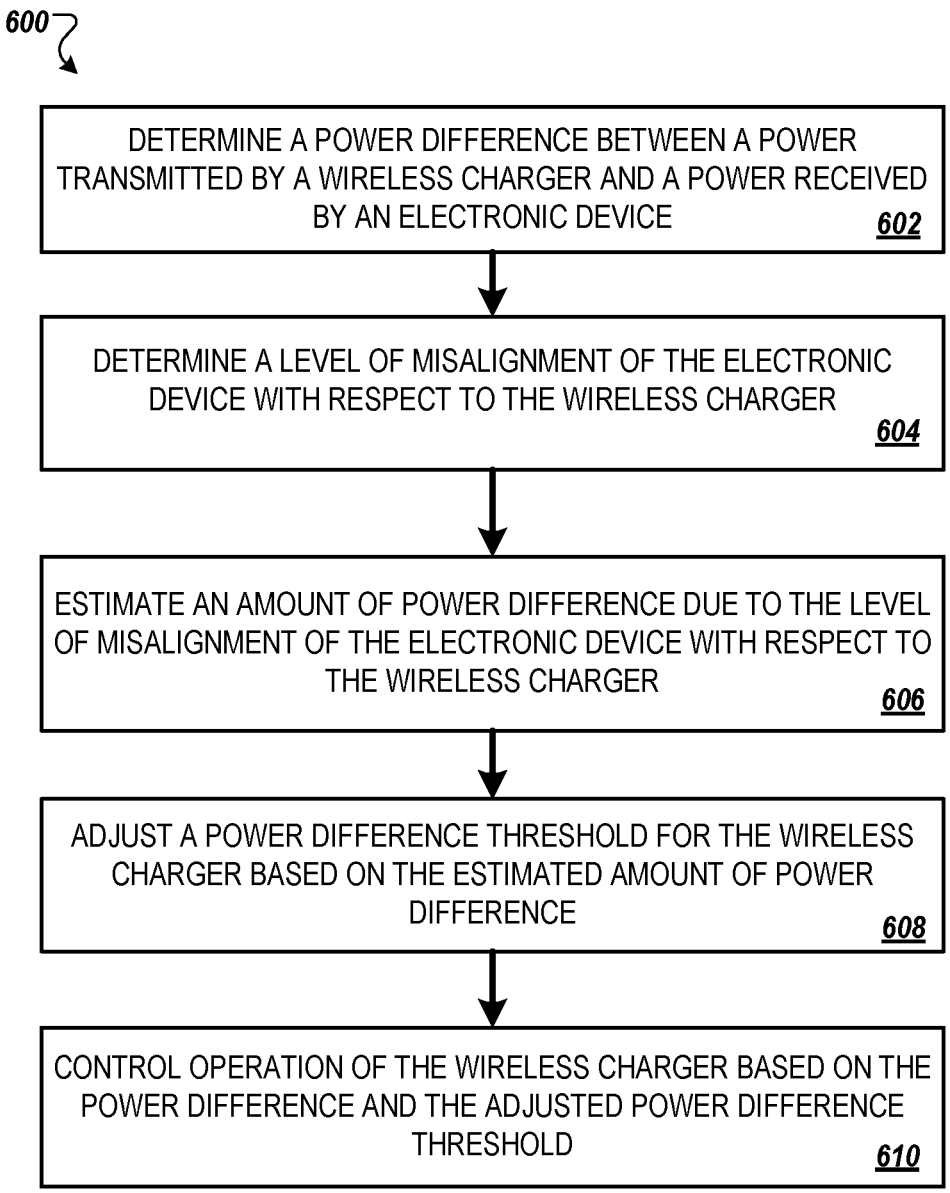
FIG. 6 is a flowchart illustrating an example of a method for controlling wireless charging.

FIG. 6 is a flowchart illustrating an example of a method 600 for enhancing wireless charging. In brief, the method 600 includes determining a power difference between a power transmitted by a wireless charger and a power received by an electronic device (602); determining a level of misalignment of the electronic device with respect to the wireless charger (604); estimating an amount of power difference due to the level of misalignment of the electronic device with respect to the wireless charger (606); adjusting a power difference threshold for the wireless charger based on the estimated amount of power difference (608); and controlling operation of the wireless charger based on the power difference and the adjusted power difference threshold (610). Though described below as being performed by a wireless charger, such as the wireless charger 204 of FIG. 2, the method could also be performed by another electronic device, for example, the electronic device 202 of FIG. 2, or system (e.g., one or more processors of the wireless charger, the electronic device, or another system).

In more detail, the method 600 includes determining a power difference between a power transmitted by a wireless charger and a power received by an electronic device (602). For example, in some implementations, the wireless charger measures a level of power transmitted by the charger and receives from the electronic device data indicating a level of power received by the device. Based on the measured transmitted power level and the data indicating the received power level, the charger determines a difference between the transmitted power level and the received power level.

The power difference between the power transmitted by the wireless charger and the power received by the electronic device can arise due to absorption of transmitted power by a foreign object (e.g., an object other than the electronic device that is within coupling range of the wireless transmitter), due to a level of misalignment of the electronic device with respect to the wireless charger, or due to other factors.

The method 600 also includes determining a level of misalignment between the wireless charger and the electronic device (604). In some implementations, the wireless charger determines the level of misalignment by receiving data indicating the misalignment from the electronic device, e.g., via a wireless data communication link.

The electronic device can include a first alignment coil and a second alignment coil that are located on opposite sides of the device's wireless power receiving coil. In some implementations, the centers of the first and second alignment coils may be located at approximately equal distances from the center of the wireless power receiving coil, but in opposite directions along a first axis that passes through the center of the wireless power receiving coil (e.g., along an X axis).

The electronic device can determine the level of misalignment of the electronic device with respect to the wireless charger by determining a first amount of misalignment of the electronic device with respect to the wireless charger along the first axis based on signals provided by the first alignment coil and the second alignment coil. For example, the signals from the alignment coils can include voltages, currents, or voltages and currents that are induced in the alignment coils by the transmitted power signal generated by the wireless charger.

Based on the signals provided by the coils, the device can determine a first amount of misalignment along the first axis that indicates a lateral displacement of the electronic device from a preferred location with respect to the wireless charger. For example, in some implementations, the device determines the first amount of misalignment based on a first voltage difference between a voltage at the first alignment coil and the voltage of the second alignment coil.

In some implementations, the electronic device further includes a third alignment coil and a fourth alignment coil located on opposite sides of the wireless power receiving coil, the third alignment coil and the fourth alignment coil being located along a second axis that is transverse to the first axis (e.g., along a Y axis). For example, the second axis can be perpendicular to the first axis. Here, the device can determine the level of misalignment of the electronic device with respect to the wireless charger by additionally determining a second amount of misalignment of the electronic device with respect to the wireless charger along the second axis based on signals provided by the third alignment coil and the fourth alignment coil.

Similar to the signals provided by the first and second alignment coils, the signals provided by the third and fourth alignment coils can be voltages, currents, or voltages and currents (e.g., voltages and/or currents induced in the coils by the transmitted power signal generated by the wireless charger). Based on the signals provided by the coils, the device can determine a second amount of misalignment along the second axis that indicates a displacement of the electronic device from a preferred location with respect to the wireless charger. For example, the device can determine the second amount of misalignment based on a second voltage difference between the voltage of the third alignment coil and the voltage of the fourth alignment coil.

In some implementations, the device or the charger can determine the level of misalignment between the wireless charger and the device by additionally, or alternatively, determining a third amount of misalignment, where the third amount of misalignment can correspond to a vertical displacement (e.g., a Z-offset) of the device relative to a preferred location with respect to the wireless charger.

In some implementations, the device or the charger determines the third amount of misalignment based on (i) a level of coupling of the electronic device with respect to the wireless charger, (ii) the first amount of misalignment, and (iii) the second amount of misalignment. The device or the charger can determine the level of coupling of the electronic device with respect to the wireless charger by determining a signal strength of transmission between the wireless charger and the electronic device. For example, the device can provide to the charger data indicating the signal strength of transmission in the form of a signal strength packet (SSP) transmitted using a wireless data communication link. The third amount of misalignment (e.g., the Z-offset) can then be determined by accessing a database that correlates the third amount of misalignment, the signal strength of transmission between the electronic device and the wireless charger, and at least one of the first amount of misalignment or the second amount of misalignment (e.g., the lateral misalignment).

In some implementations, the device or the charger determines the level of misalignment of the electronic device with respect to the wireless charger based on determining a physical dimension of an enclosure of the electronic device. For example, the device or the charger can receive information identifying the enclosure of the electronic device or indicating a dimension of the enclosure, e.g., from data input by a user of the device, from a wireless signal communicated by a radio-frequency identification (RFID) tag of the enclosure, of from another source, and, based on that information, determine the level of misalignment of the electronic device with respect to the wireless charger. For example, the information received by the device or the charger may include an identifier for the enclosure. Using the identifier, the device or the charger can access a look-up table or a database that correlates enclosure identifiers with a level of misalignment (e.g., vertical displacement, Z-offset).

In some implementations, the electronic device provides data indicating the level of misalignment of the device with respect to the wireless charger (e.g., the first amount of misalignment, the second amount of misalignment, and/or the third amount of misalignment) to the wireless charger or to another electronic device, e.g., through a wireless data communication link.

Based on the determined level of misalignment, the charger estimates an amount of power difference due to the level of misalignment of the electronic device with respect to the wireless charger (606). For example, where the level of misalignment is indicated by the first amount of misalignment along the first axis, the charger can estimate the amount of power difference based on the first amount of misalignment. The level of misalignment can be indicated by the first amount of misalignment and a second amount of misalignment along the second axis, the charger can estimate the amount of power difference based on the first amount and/or the second amount of misalignment. The level of misalignment can be indicated by the first amount, the second amount, and the third amount of misalignment, the charger can estimate the amount of power difference based on any combination of the first, second, and/or third amounts of misalignment.

In some implementations, the charger estimates the amount of power difference due to the level of misalignment by accessing a look-up table, e.g., in a database, that associates an amount of power difference due to misalignment with at least one of the first amount of misalignment, the second amount of misalignment, or the third amount of misalignment. In some implementations, the charger estimates the amount of power difference due to the level of misalignment by using an algorithm or another predetermined relationship between the amount of power difference and at least one of the first, second, or third amounts of misalignment.

In some implementations, the charger estimates an amount of power difference due to the misalignment level of the electronic device with respect to the wireless charger by estimating an amount of power difference based on amounts of power difference experienced during one or more previous wireless charging sessions for the electronic device. For example, a user may consistently position the device on the wireless charger such that it is misaligned with respect to the charger. The charger can detect and record the misalignment and/or the amount of power difference associated with the misalignment during one or more wireless charging sessions. Based on the misalignments or power differences recorded for the previous charging sessions, the charger can estimate the power difference due to misalignment for a current charging session. To estimate the power difference due to misalignment based on the misalignments or power differences experienced during one or more previous wireless charging sessions, the charger may use any of various predictive techniques, including one or more of regression models, machine learning models, parametric models, or other computational analysis techniques.

Based on the estimated amount of power difference due to the misalignment of the electronic device with respect to the charger, the charger adjusts a power difference threshold for the wireless charger (608). The power difference threshold can represent, for instance, an estimated amount of power absorbed by a foreign object that is associated with an unsafe level of heating of the object. By adjusting the power difference threshold based on the estimated amount of power difference due to the misalignment, the system can more accurately detect when a foreign object within coupling range of the charger may be heating to an unsafe level.

In some implementations, the charger adjusts the power difference threshold by determining a sum of the estimated amount of power difference due to misalignment and a predetermined power difference threshold (e.g., a predetermined power difference threshold). As a result, the adjusted power difference threshold may represent a greater power difference than the power difference threshold.

Based on the determined power difference (i.e., the power difference between the power transmitted by the wireless charger and the power received by the electronic device) and the adjusted power difference threshold, the charger controls operation of the wireless charger (610). In some implementations, the operation of the wireless charger is controlled based on determining that the power difference does not satisfy the adjusted power difference threshold. For example, the charger can determine that the power difference satisfies the adjusted power difference threshold because the difference exceeds the adjusted power difference threshold. Based on the determination, the charger can then control operation of the wireless charger.

The operation of the charger can be controlled in any of various ways. For example, in some implementations, the wireless charger transmits power in response to determining that the power difference satisfies the adjusted power difference threshold. In some cases, the wireless charger terminates transmitting power in response to determining that the power difference does not satisfy the adjusted power difference threshold. In some cases, the power difference does not satisfy the power difference threshold prior to adjustment, but does satisfy the adjusted power difference threshold. As a result, because the adjusted power difference threshold is satisfied, the wireless charger will continue charging (e.g., it will transmit power), even though the power difference did not satisfy the power difference threshold prior to adjustment. In this way, the system can prevent premature termination of charging.

In some implementations, the wireless charger reduces the level of transmitted power from a first power level to a second power level based on determining that the power difference corresponding to the first power level does not satisfy a power difference threshold before adjustment. For example, the charger can determine a power difference for transmission of power at the first power level and a power difference threshold before adjustment that also corresponds to the first power level. In response to determining that the power difference at the first power level does not satisfy the power difference threshold before adjustment (e.g., the power difference exceeds the power difference threshold), the charger can control the wireless charger to transmit power at the lower second power level. The charger can maintain charging at the lower, second power level if it determines that the power difference between the power transmitted at the second power level and the power received by the electronic device while the charger is transmitting at the second power level satisfies an adjusted power difference threshold, where the adjusted power difference threshold corresponds to the second transmitted power level.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   determining a power loss between a transmitted power that is transmitted by a wireless charger and a received power that is received by an electronic device, the wireless charger including a power transmission coil adapted to wirelessly transmit power to a power receiving coil of the electronic device;
   determining a physical position of the electronic device with respect to the wireless charger using an alignment sensor of the wireless charger that is distinct from the power transmission coil of the wireless charger, the physical position of the electronic device causing the power receiving coil of the electronic device to be misaligned with respect to the power transmission coil of the wireless charger;
   estimating a portion of the power loss that is due to the physical position of the electronic device causing the power receiving coil of the electronic device to be misaligned with respect to the power transmission coil of the wireless charger, the portion of the power loss being less than an entirety of the power loss;
   setting a power loss threshold based on the portion of the power loss that is due to the physical position of the electronic device causing the power receiving coil to be misaligned with respect to the power transmission coil, the power loss threshold indicating a power level at which inefficiencies in wireless power transmission from the wireless charger to the electronic device indicate presence of a foreign object; and
   reducing wireless power transmission from the wireless charger to the electronic device as a result of the power loss between the transmitted power and the received power not satisfying the power loss threshold.

2. The method of claim 1, comprising, before reducing the wireless power transmission, transmitting power from the wireless charger to the electronic device in response to determining that the power loss satisfies the power loss threshold.

3. The method of claim 1, wherein the alignment sensor of the wireless charger includes an alignment coil that is distinct from the power transmission coil.

4. The method of claim 1, wherein:
   estimating the portion of the power loss that is due to the physical position of the electronic device includes accessing information that correlates (i) a level of misalignment of the power receiving coil with respect to the power transmission coil, to (ii) a power loss value; and
   the portion of the power loss that is due to the physical position of the electronic device is based on the power loss value.

5. The method of claim 1, wherein:
   the information includes a accessing a function, look-up table, or other data structure that correlates the level of misalignment to the power loss value; and the function, look-up-table, or other data structure being configured to provide different power loss values for different levels of misalignment.

6. The method of claim 1, wherein setting the power loss threshold based on the portion of the power loss that is due to the physical position of the electronic device includes combining the portion of the power loss that is due to the physical position of the electronic device with an initial power loss threshold.

7. The method of claim 1, wherein reducing the wireless power transmission from the wireless charger to the electronic device includes ceasing wireless power transmission from the wireless charger to the electronic device.

8. A method comprising:
   determining a power difference between a power transmitted by a wireless charger and a power received by an electronic device, wherein the power difference is determined for transmission of power by the wireless charger at a first power level;
   determining a level of misalignment of the electronic device with respect to the wireless charger;
   estimating an amount of power difference due to the level of misalignment of the electronic device with respect to the wireless charger;
   adjusting a power difference threshold for the wireless charger based on the estimated amount of power difference, wherein the power difference threshold before adjustment corresponds to the first power level, wherein the adjusted power difference threshold corresponds to a second power level that is lower than the first power level; and
   controlling operation of the wireless charger based on the power difference and the adjusted power difference threshold, wherein controlling operation of the wireless charger based on the power difference and the adjusted power difference threshold comprises:
      in response to determining that the power difference does not satisfy the power difference threshold before adjustment, controlling the wireless charger to transmit power at the second power level that is lower than the first power level; and
      maintaining charging at the second power level in response to determining that a second power difference between the power transmitted at the second power level and a second power received by the electronic device satisfies the adjusted power difference threshold.

9. A method comprising:
   determining a power difference between a power transmitted by a wireless charger and a power received by an electronic device, wherein the electronic device comprises a wireless power receiving coil, and a first alignment coil and a second alignment coil located on opposite sides of the wireless power receiving coil;
   determining a level of misalignment of the electronic device with respect to the wireless charger, wherein determining the level of misalignment of the electronic device with respect to the wireless charger comprises determining a first amount of misalignment of the electronic device with respect to the wireless charger along a first axis based on signals provided by the first alignment coil and the second alignment coil;
   estimating an amount of power difference due to the level of misalignment of the electronic device with respect to the wireless charger, wherein estimating the amount of power difference due to the level of misalignment of the electronic device with respect to the wireless charger comprises estimating the amount of power difference based on the determined first amount of misalignment;
   adjusting a power difference threshold for the wireless charger based on the estimated amount of power difference; and
   controlling operation of the wireless charger based on the power difference and the adjusted power difference threshold.

10. The method of claim 9, wherein:
   the electronic device further comprises a third alignment coil and a fourth alignment coil located on opposite sides of the wireless power receiving coil, the third alignment coil and the fourth alignment coil being located along a second axis that is transverse to the first axis;
   determining the level of misalignment of the electronic device with respect to the wireless charger further comprises determining a second amount of misalignment of the electronic device with respect to the wireless charger along the second axis based on signals provided by the third alignment coil and the fourth alignment coil; and
   estimating the amount of power difference due to the level of misalignment of the electronic device with respect to the wireless charger comprises estimating the amount of power difference based on the first amount of misalignment and the second amount of misalignment.

11. The method of claim 10, wherein the signals from the alignment coils comprise voltages, currents, or voltages and currents.

12. The method of claim 11, wherein:
   determining the level of misalignment of the electronic device with respect to the wireless charger comprises:
      determining the first amount of misalignment of the electronic device with respect to the wireless charger based on a first voltage difference between a voltage at the first alignment coil and a voltage at the second alignment coil; and
      determining the second amount of misalignment of the electronic device with respect to the wireless charger based on a second voltage difference between a voltage at the third alignment coil and a voltage at the fourth alignment coil.

13. The method of claim 10, wherein the second axis is perpendicular to the first axis.

14. The method of claim 10, wherein determining the level of misalignment of the electronic device with respect to the wireless charger further comprises determining a third amount of misalignment of the electronic device with respect to the wireless charger based on (i) a level of coupling of the electronic device with respect to the wireless charger, (ii) the first amount of misalignment, and (iii) the second amount of misalignment; and
   wherein estimating the amount of power difference due to the level of misalignment of the electronic device with respect to the wireless charger comprises estimating the amount of power difference based on the first amount of misalignment, the second amount of misalignment, and the third amount of misalignment.

15. The method of claim 14, comprising determining a signal strength of transmission between the electronic device and the wireless charger as a level of coupling of the electronic device with respect to the wireless charger;
   wherein determining the third amount of misalignment of the electronic device with respect to the wireless charger comprises accessing a database that correlates the third amount of misalignment, the signal strength of transmission between the electronic device and the wireless charger, and at least one of the first amount of misalignment or the second amount of misalignment.

16. The method of claim 14, wherein estimating the amount of power difference due to the level of misalignment of the electronic device with respect to the charger comprises accessing a look-up table that associates an amount of power difference due to the level of misalignment with at least one of the first amount of misalignment, the second amount of misalignment, or the third amount of misalignment.

17. A system comprising:
one or more processors; and one or more computer-readable media having instructions stored thereon that, when executed by the one or more processors, cause the one or more processors to perform operations comprising:
determining a power loss between a transmitted power that is transmitted by a wireless charger and a received power that is received by an electronic device, the wireless charger including a power transmission coil adapted to wirelessly transmit power to a power receiving coil of the electronic device;
determining a physical position of the electronic device with respect to the wireless charger using an alignment sensor of the wireless charger that is distinct from the power transmission coil of the wireless charger, the physical position of the electronic device causing the power receiving coil of the electronic device to be misaligned with respect to the power transmission coil of the wireless charger;
estimating a portion of the power loss that is due to the physical position of the electronic device causing the power receiving coil of the electronic device to be misaligned with respect to the power transmission coil of the wireless charger, the portion of the power loss being less than an entirety of the power loss;
setting a power loss threshold based on the portion of the power loss that is due to the physical position of the electronic device causing the power receiving coil to be misaligned with respect to the power transmission coil, the power loss threshold indicating a power level at which inefficiencies in wireless power transmission from the wireless charger to the electronic device indicate presence of a foreign object; and
reducing wireless power transmission from the wireless charger to the electronic device as a result of the power loss between the transmitted power and the received power not satisfying the power loss threshold.

* * * * *